US009584835B2

(12) United States Patent
Tremblay

(10) Patent No.: US 9,584,835 B2
(45) Date of Patent: Feb. 28, 2017

(54) SYSTEM AND METHOD FOR BROADCASTING INTERACTIVE CONTENT

(71) Applicant: DECISION-PLUS M.C. INC., Montreal (CA)

(72) Inventor: Carl Tremblay, Verdun (CA)

(73) Assignee: DECISION-PLUS M.C. INC., Montreal (CA)

( * ) Notice: Subject to any disclaimer, the term of this patent is extended or adjusted under 35 U.S.C. 154(b) by 0 days.

(21) Appl. No.: 14/426,419

(22) PCT Filed: Sep. 6, 2013

(86) PCT No.: PCT/CA2013/000765
§ 371 (c)(1),
(2) Date: Mar. 6, 2015

(87) PCT Pub. No.: WO2014/036642
PCT Pub. Date: Mar. 13, 2014

(65) Prior Publication Data
US 2015/0245079 A1    Aug. 27, 2015

Related U.S. Application Data

(60) Provisional application No. 61/697,461, filed on Sep. 6, 2012.

(51) Int. Cl.
*H04N 21/61* (2011.01)
*H04N 21/214* (2011.01)
(Continued)

(52) U.S. Cl.
CPC ...... *H04N 21/2187* (2013.01); *H04H 20/103* (2013.01); *H04H 20/18* (2013.01);
(Continued)

(58) Field of Classification Search
CPC .......... H04N 21/4788; H04N 21/2743; H04N 21/632; H04N 21/2187; H04N 21/242;
(Continued)

(56) References Cited

U.S. PATENT DOCUMENTS 5,930,473 A   7/1999  Teng et al.
6,357,042 B2  3/2002  Srinivasan et al.
(Continued)

FOREIGN PATENT DOCUMENTS

WO     WO 01/82621      11/2001
WO     WO 2012/057835    5/2012

OTHER PUBLICATIONS

DeMaria, "Live From Your Office: It's Webcasting—Need to transmit interactive webcasts to multiple locations? These three remote presentation packages let you choose from software, hardware and service-based options.", Network Computing, Jun. 24, 2004, http://business.highbeam.com/4113/article-1G1-118684584/live-your-office-webcasting-need-transmit-interactive.
(Continued)

*Primary Examiner* — Benjamin R Bruckart
*Assistant Examiner* — Aklil Tesfaye
(74) *Attorney, Agent, or Firm* — Norton Rose Fulbright Canada LLP

(57) ABSTRACT

There is provided a system and method for streaming content to a plurality of devices over a network. A first stream comprising a first live feed is received from a first source, a second stream comprising a second live feed received from a second source, the first live feed synchronized with the second live feed, and a third stream comprising the synchronized first and second live feed generated and sent to each device. An interface is also presented on each device and the live feed displayed therewithin, a request signal indicative of a request for interactive content (Continued)

received, a control signal comprising instructions for retrieving the interactive content from the memory sent to each device, and the interface dynamically modified for causing the retrieved interactive content to be displayed concurrently with the live feed.

13 Claims, 19 Drawing Sheets

(51) Int. Cl.
| | |
|---|---|
| H04N 21/6405 | (2011.01) |
| H04N 21/2187 | (2011.01) |
| H04N 21/242 | (2011.01) |
| H04N 21/4223 | (2011.01) |
| H04H 20/18 | (2008.01) |
| H04H 20/38 | (2008.01) |
| H04H 20/10 | (2008.01) |
| H04H 20/82 | (2008.01) |

(52) U.S. Cl.
CPC .......... H04H 20/38 (2013.01); H04N 21/242 (2013.01); H04H 20/82 (2013.01); H04N 21/4223 (2013.01)

(58) Field of Classification Search
CPC ............. H04N 21/812; H04N 21/4223; H04N 21/4126; H04N 7/15; H04N 7/185; H04N 21/6125; H04N 21/41407; H04N 21/6405; H04N 21/2107
See application file for complete search history.

(56) References Cited

U.S. PATENT DOCUMENTS

| | | | |
|---|---|---|---|
| 6,434,621 B1 | 8/2002 | Pezzillo et al. | |
| 7,203,758 B2 | 4/2007 | Cook et al. | |
| 7,660,416 B1 | 2/2010 | Kline | |
| 7,802,004 B2 | 9/2010 | O'Rourke et al. | |
| 7,941,564 B2 | 5/2011 | Gebhardt et al. | |
| 8,150,918 B1 | 4/2012 | Edelman et al. | |
| 2001/0044851 A1 | 11/2001 | Rothman et al. | |
| 2002/0023165 A1 | 2/2002 | Lahr | |
| 2003/0004793 A1 | 1/2003 | Feuer et al. | |
| 2003/0171991 A1 | 9/2003 | Robbins | |
| 2004/0073596 A1 | 4/2004 | Kloninger et al. | |
| 2004/0133467 A1 | 7/2004 | Siler | |
| 2006/0253542 A1 | 11/2006 | McCausland et al. | |
| 2007/0005795 A1 | 1/2007 | Gonzalez | |
| 2007/0277208 A1* | 11/2007 | Asbun | H04N 21/235 725/110 |
| 2007/0300273 A1* | 12/2007 | Turner | G06Q 30/02 725/105 |
| 2008/0065507 A1 | 3/2008 | Morrison et al. | |
| 2008/0222504 A1 | 9/2008 | Chitturi | |
| 2010/0023395 A1 | 1/2010 | Bugenhagen | |
| 2010/0023986 A1 | 1/2010 | Bugenhagen | |
| 2010/0250772 A1 | 9/2010 | Mao | |
| 2010/0319045 A1 | 12/2010 | Lee | |
| 2011/0093895 A1* | 4/2011 | Lee | H04N 21/4432 725/40 |
| 2011/0119711 A1* | 5/2011 | Marshall | H04N 5/44591 725/41 |
| 2011/0161409 A1 | 6/2011 | Nair et al. | |
| 2012/0089718 A1 | 4/2012 | Berg et al. | |
| 2012/0102233 A1* | 4/2012 | Shah | G06F 17/30017 709/248 |
| 2012/0133727 A1* | 5/2012 | Bolduc | H04N 7/152 348/14.07 |
| 2012/0144416 A1* | 6/2012 | Wetzer | H04N 21/25816 725/14 |
| 2012/0166289 A1 | 6/2012 | Gadoury et al. | |
| 2014/0068681 A1* | 3/2014 | Lemmey | H04N 21/242 725/74 |

OTHER PUBLICATIONS

Fontana et al., "A Web 2.0 Collaborative Virtual Environment to Manage Videos and e-Learning Objects for Mobile Lectures and Seminars: MobiLesson 11", Proceedings from World Conference on Educational Media and Technology, Jun. 27, 2011 in Lisbon, pp. 1522-1529. Association for the Advancement of Computing in Education (AACE).

* cited by examiner

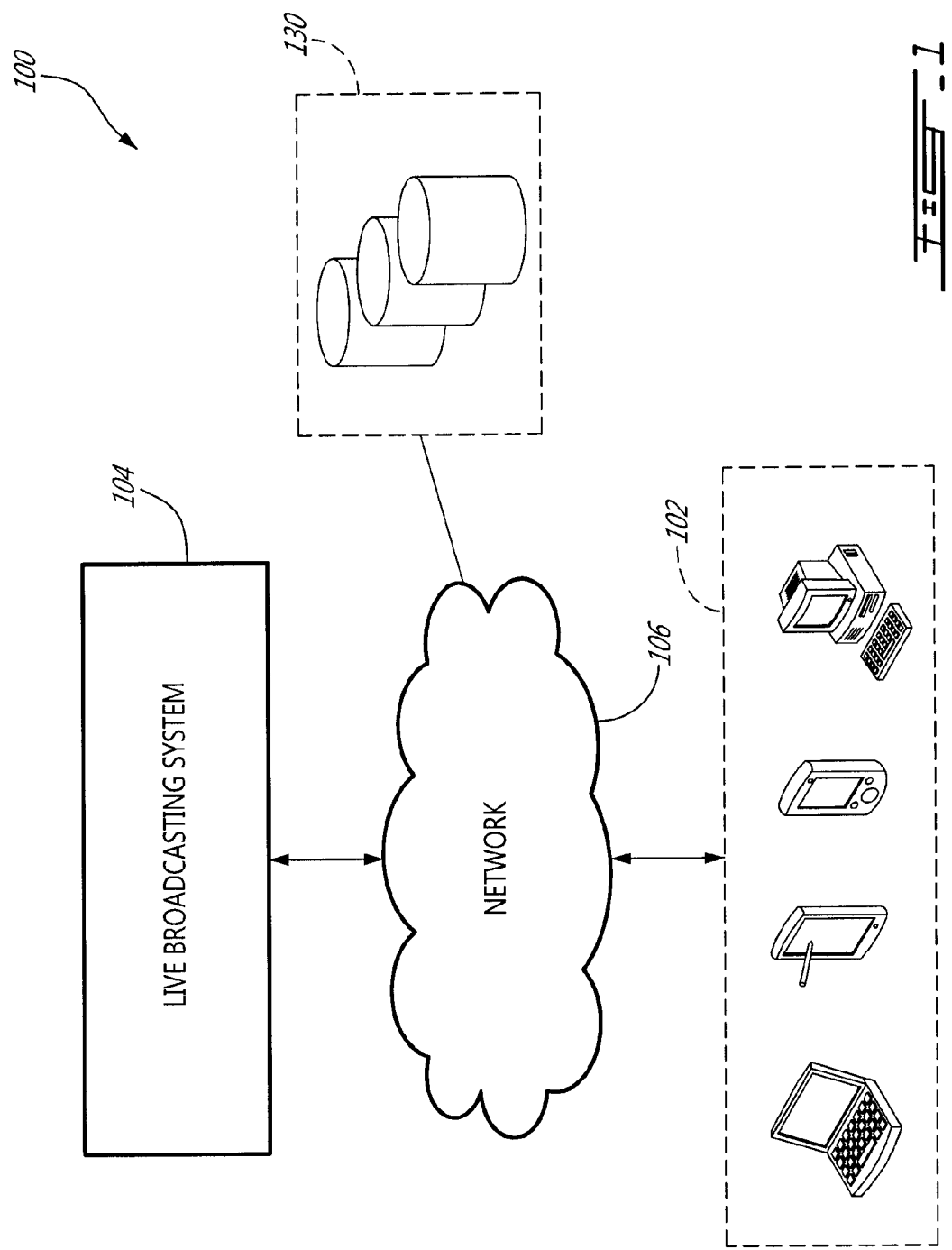

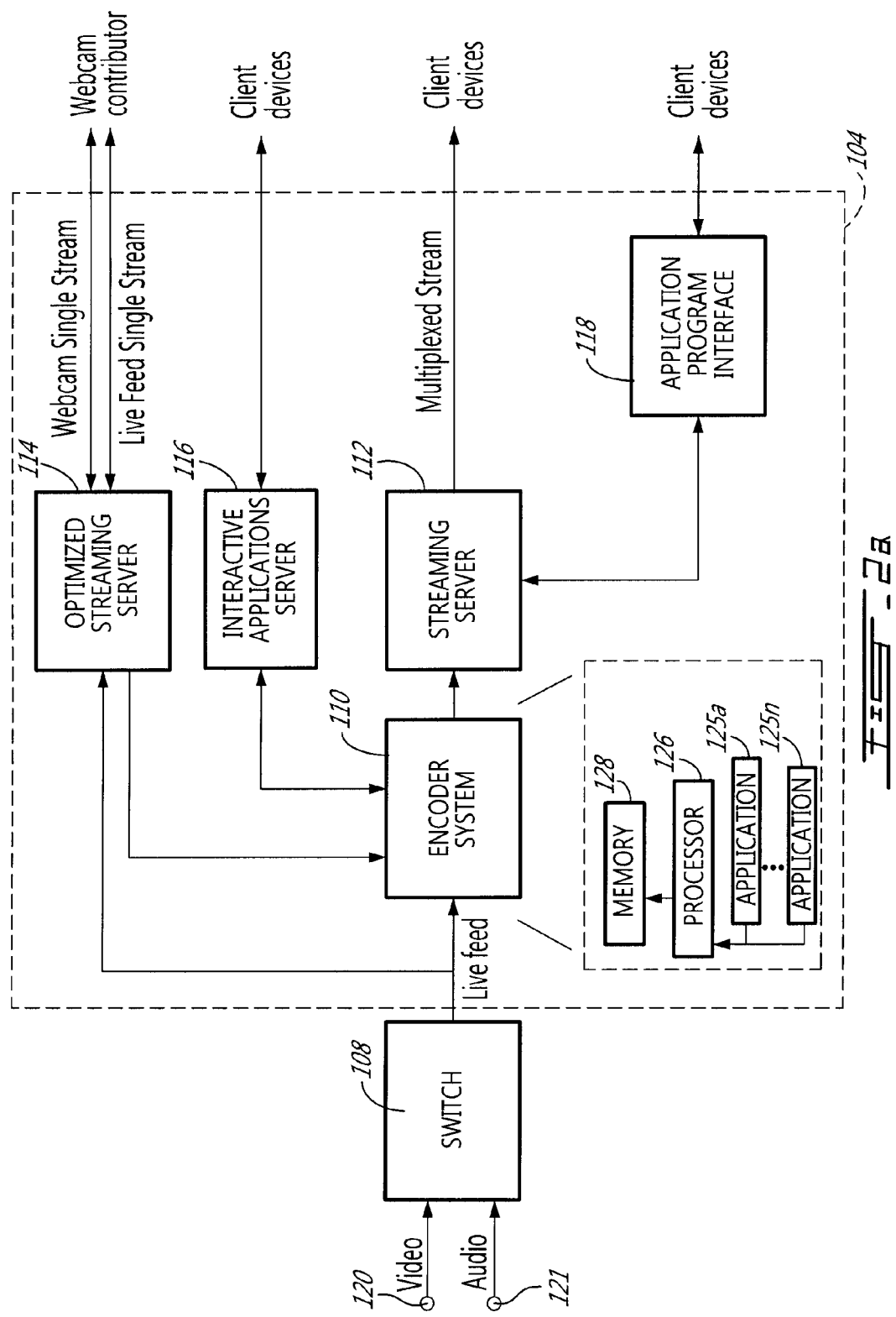

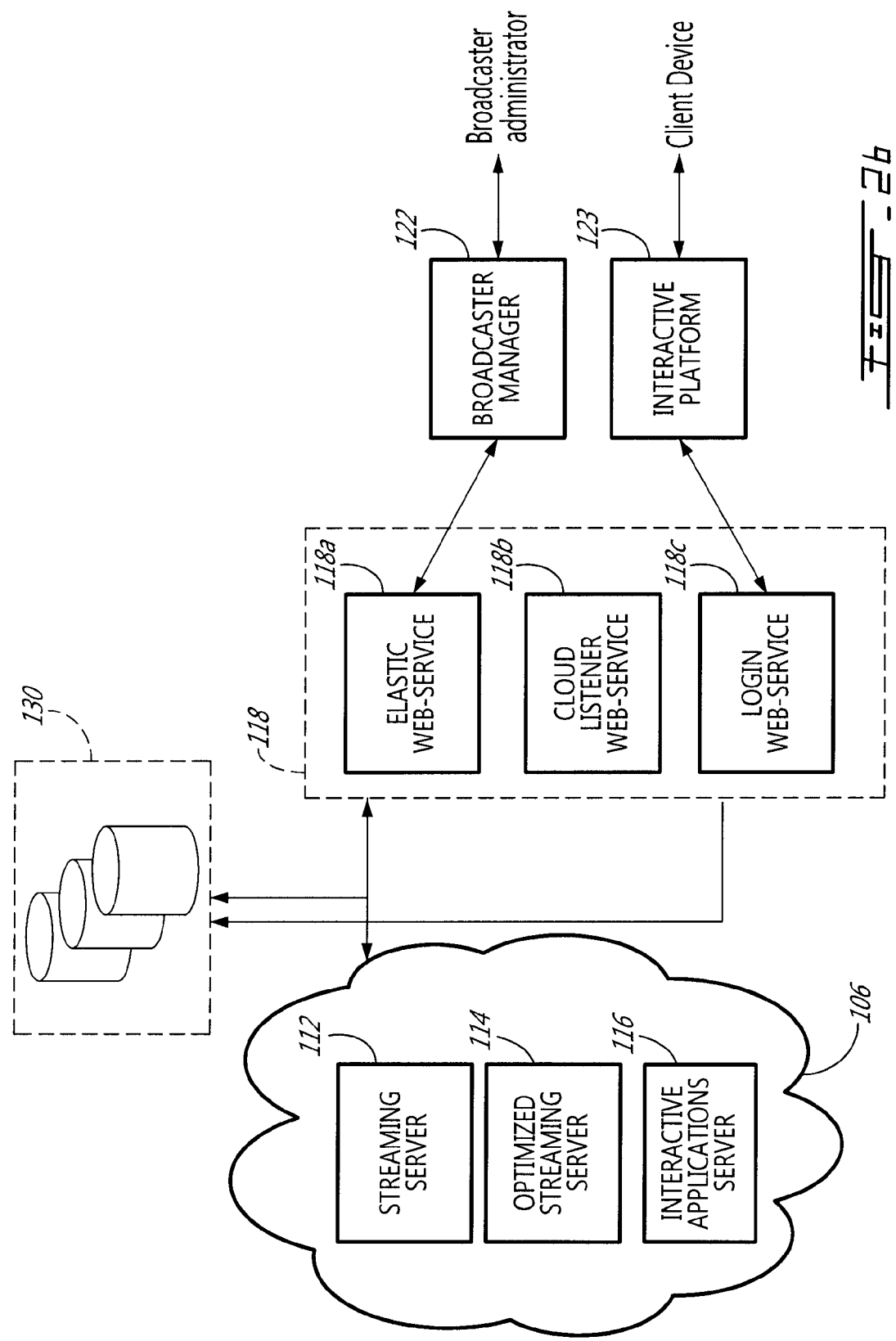

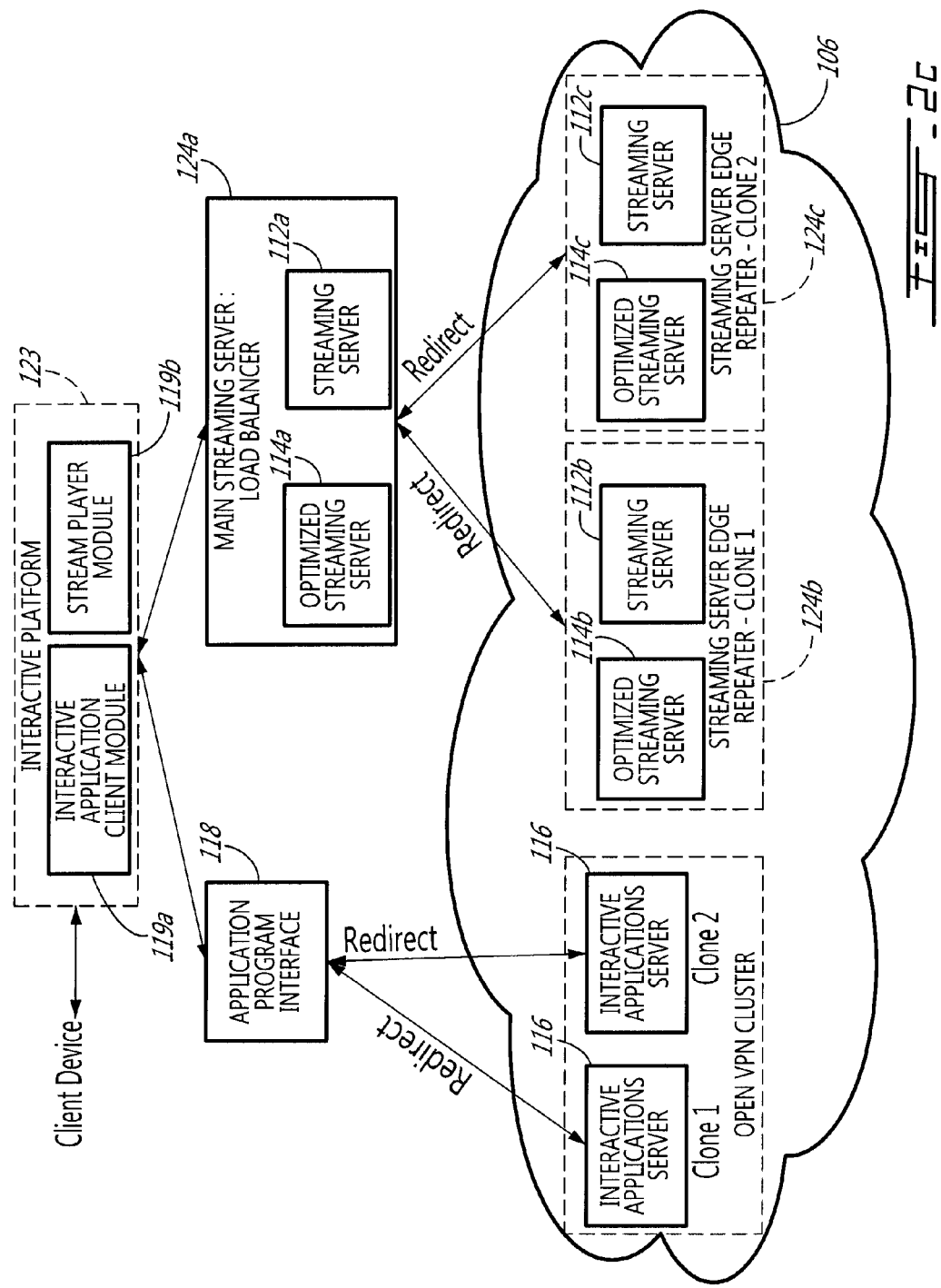

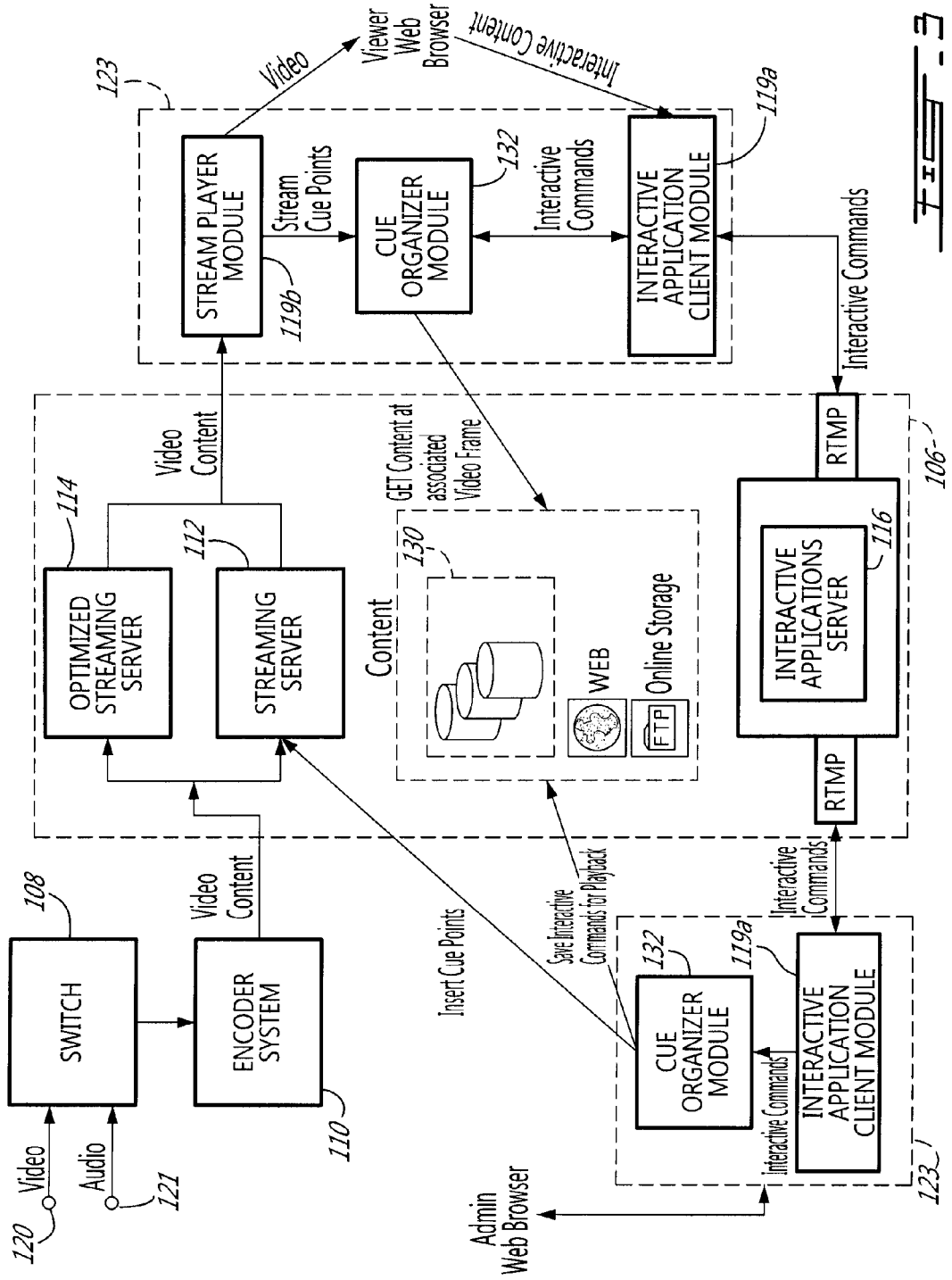

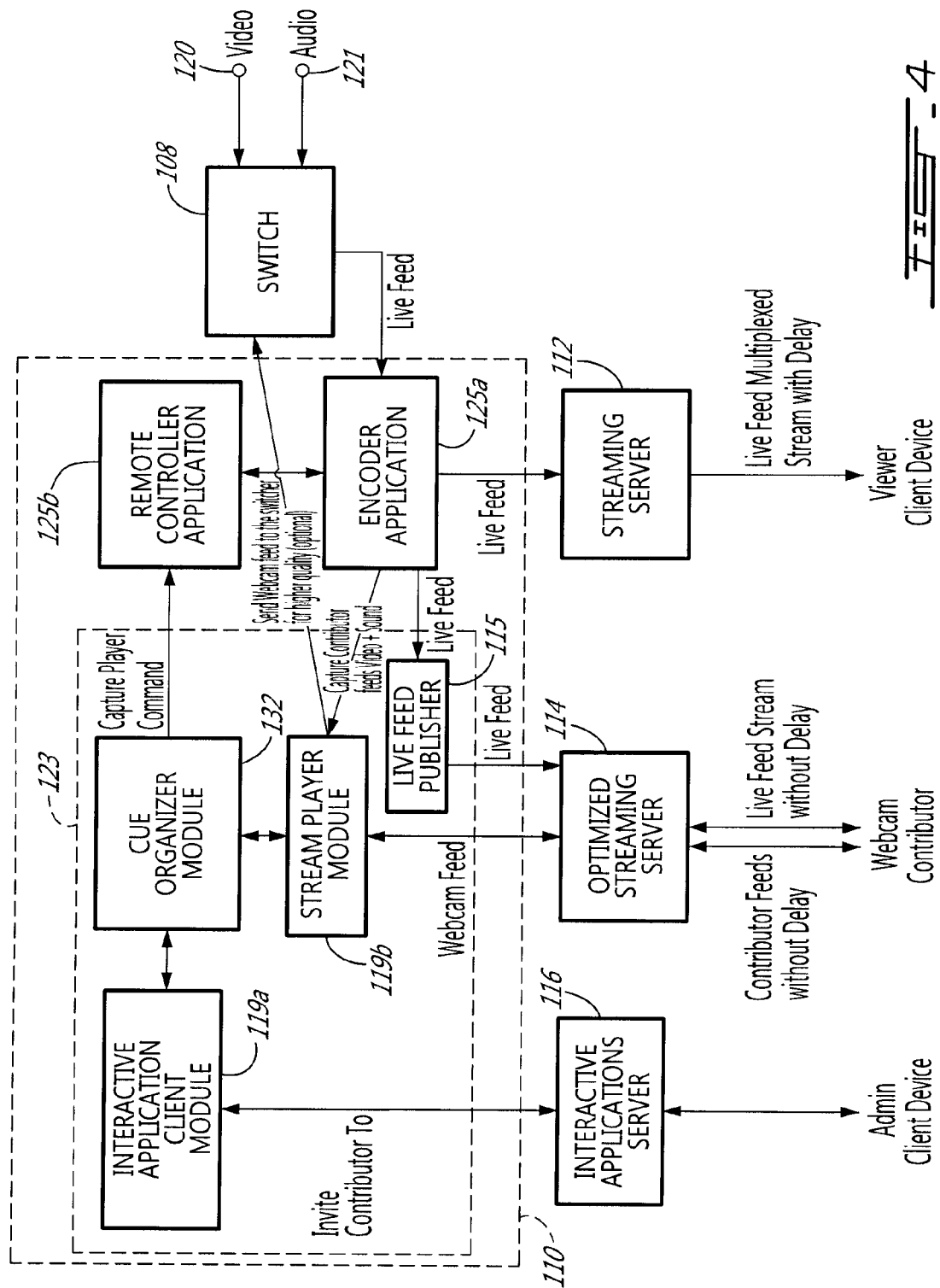

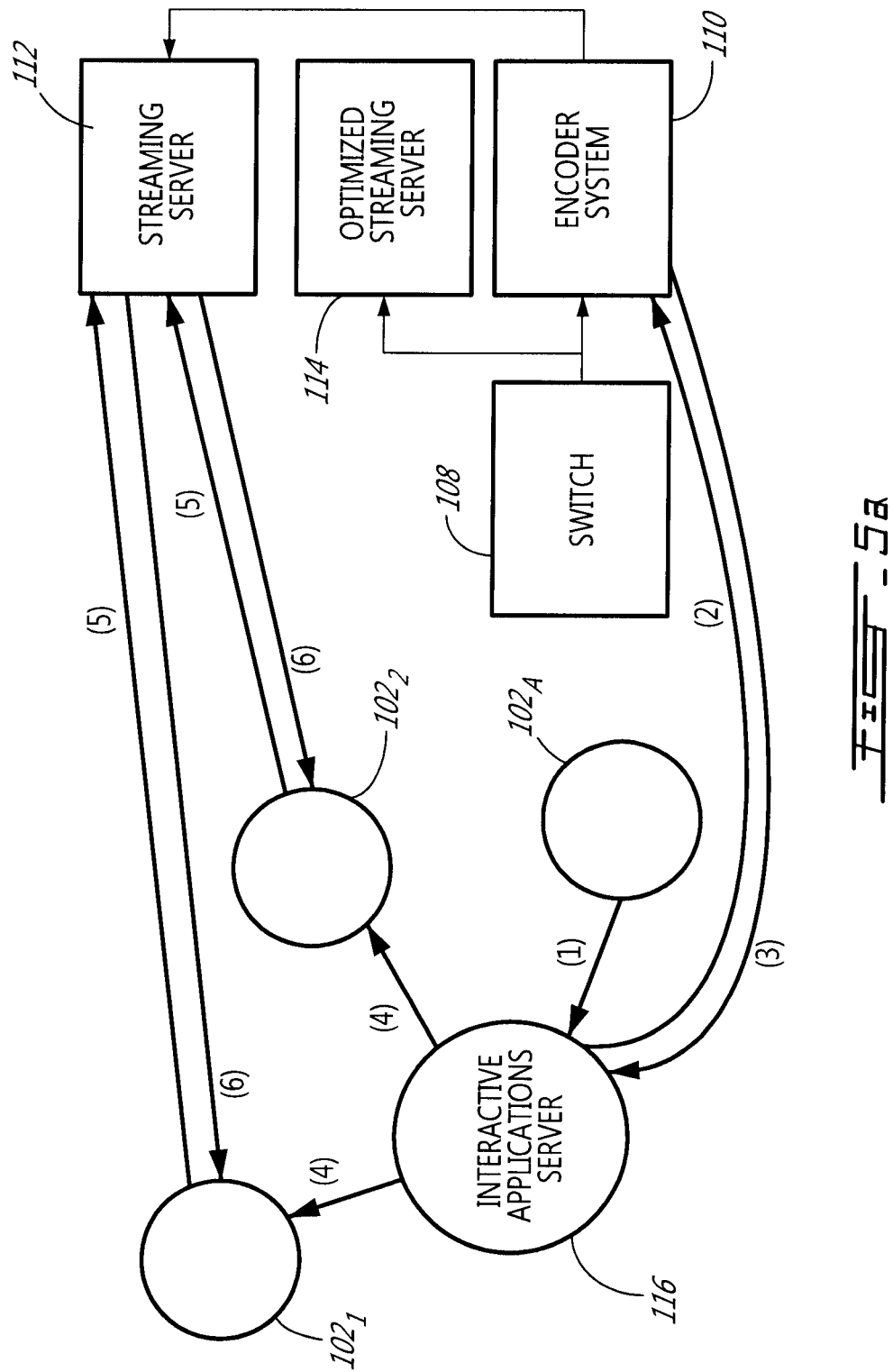

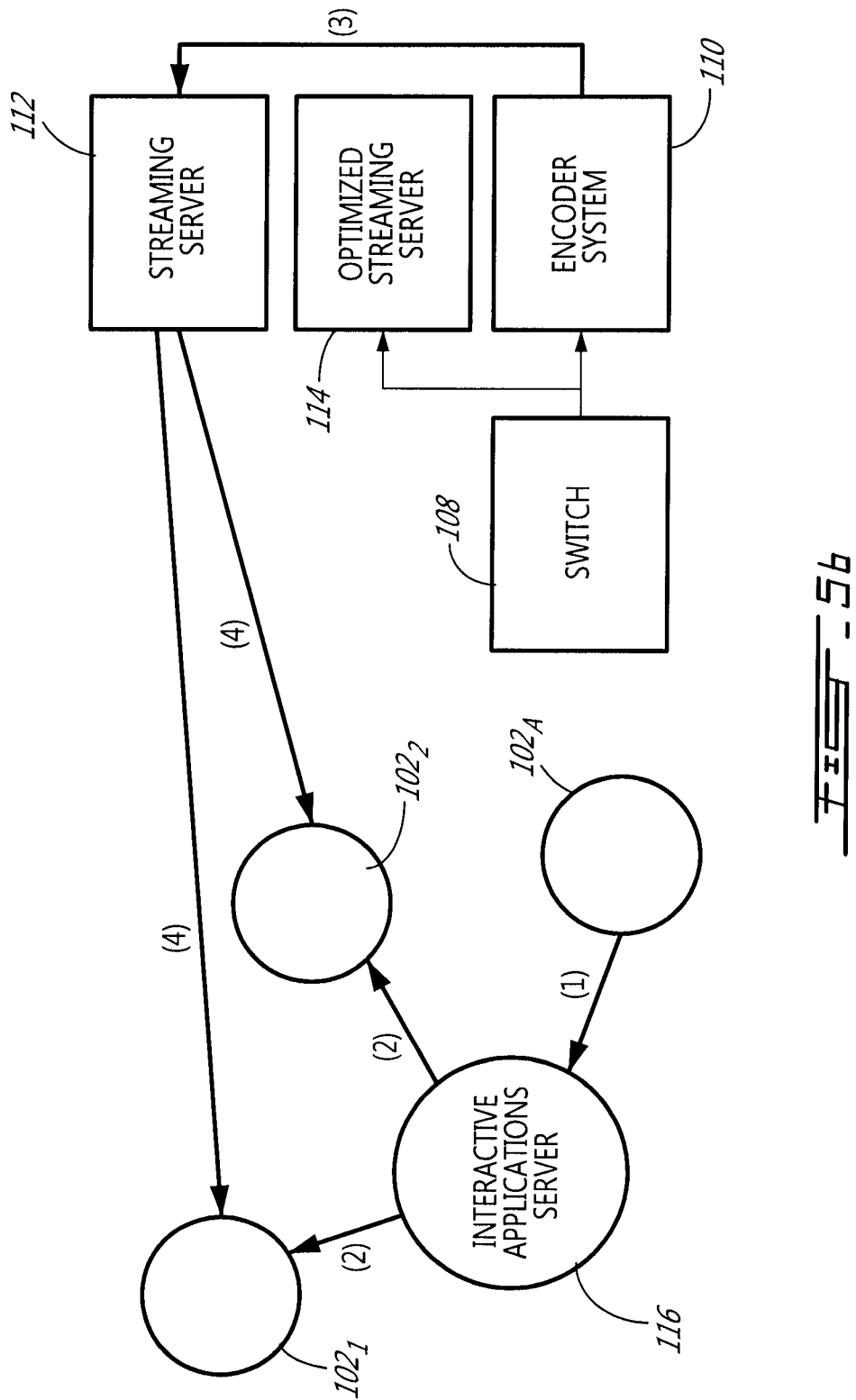

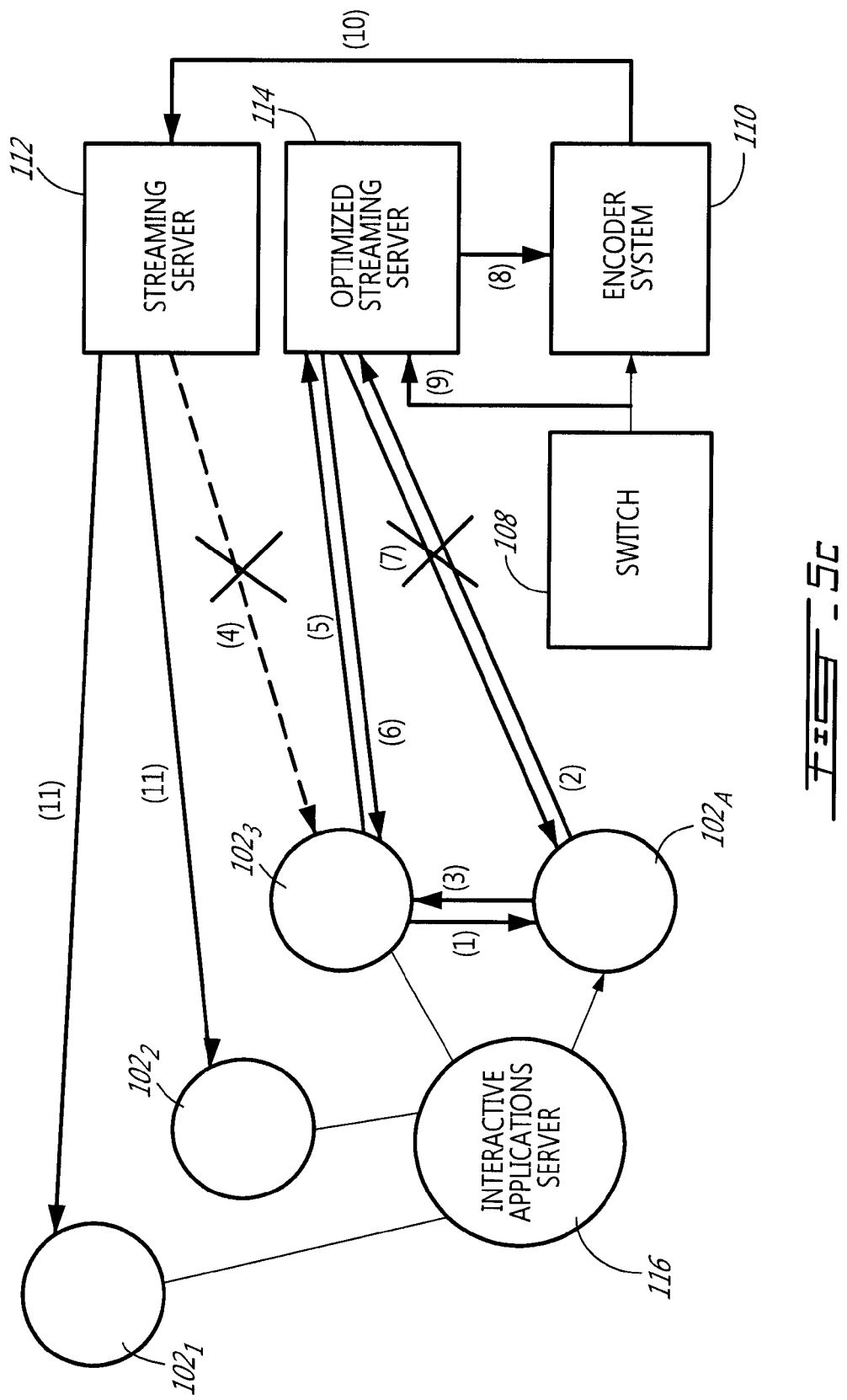

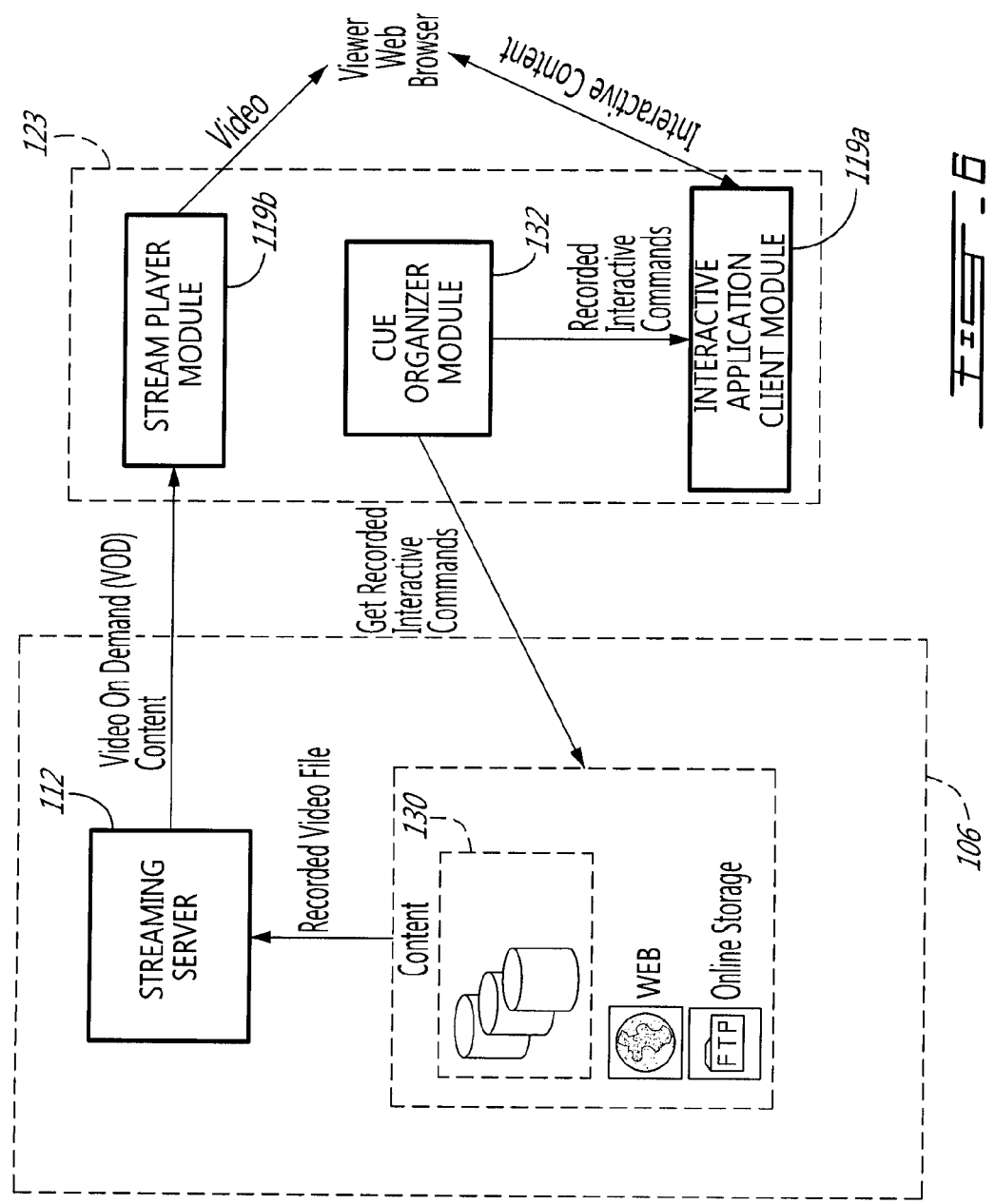

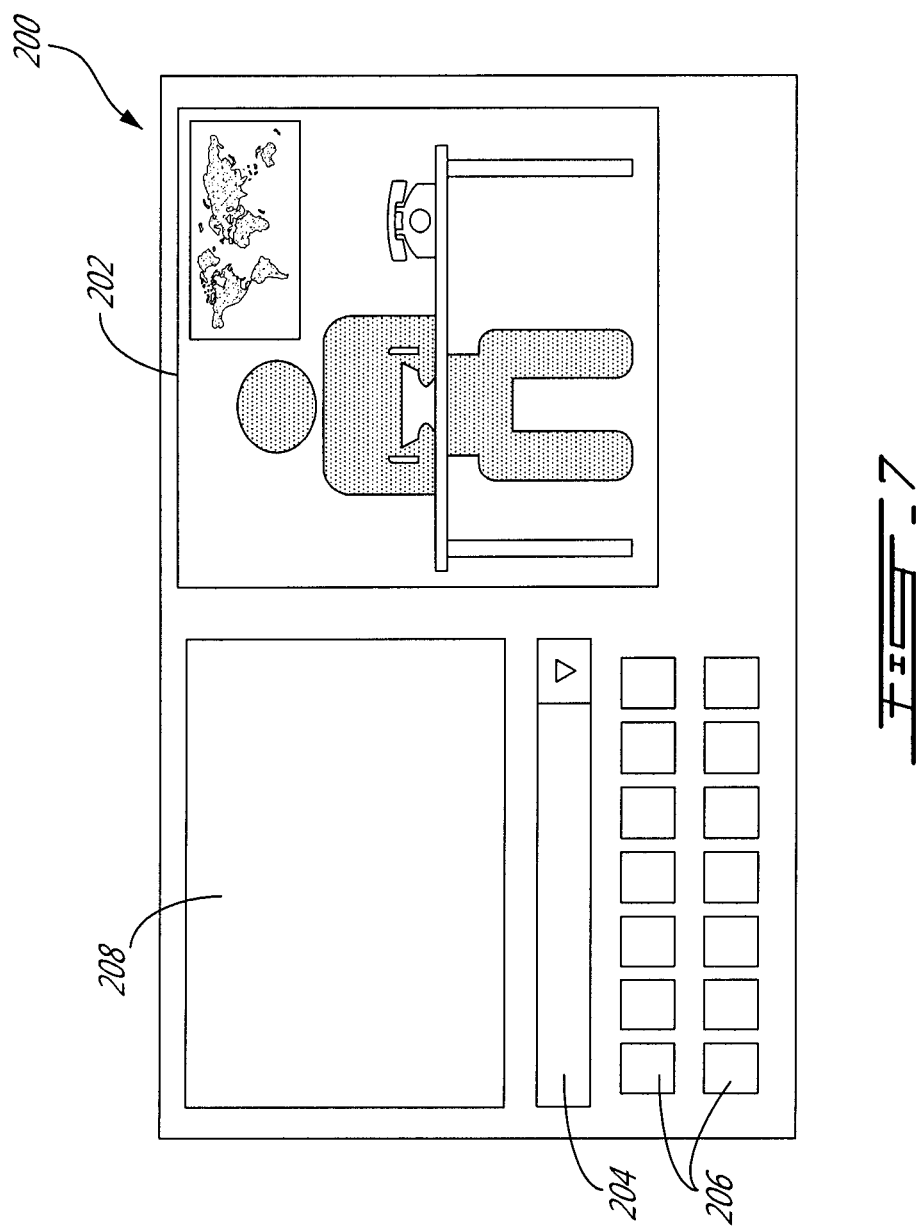

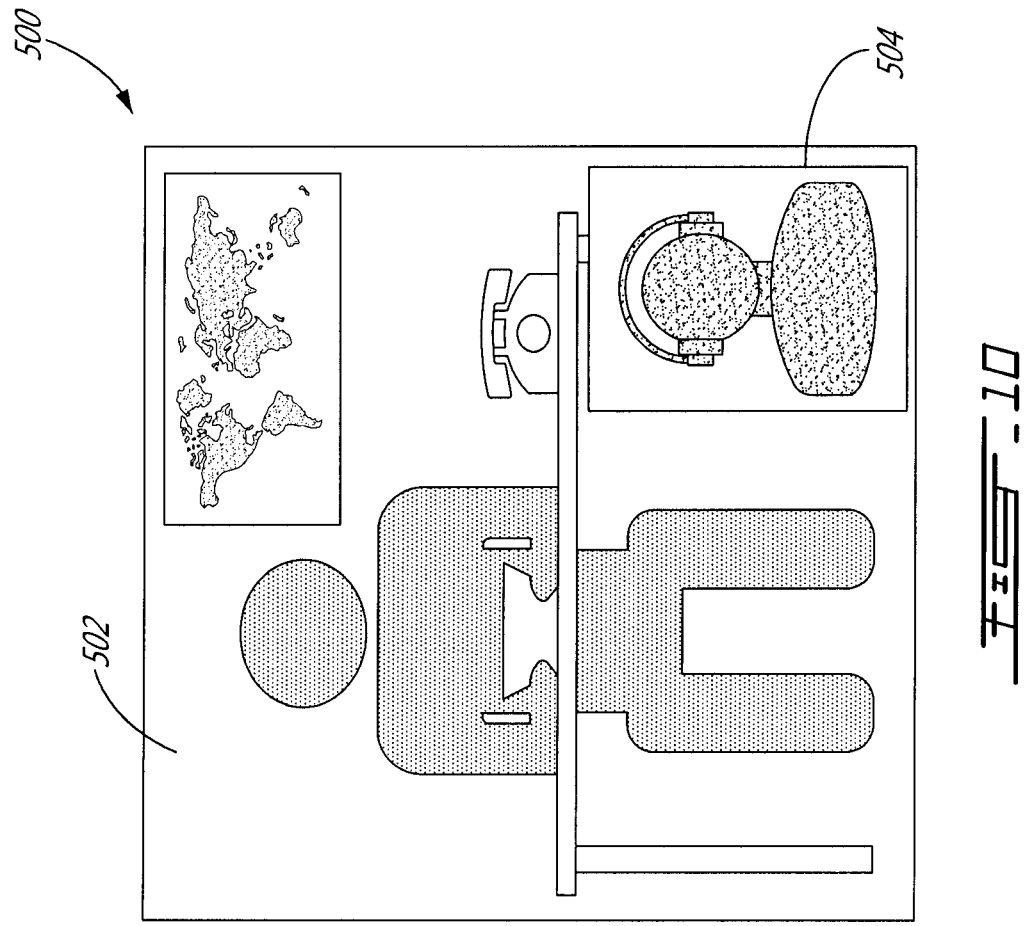

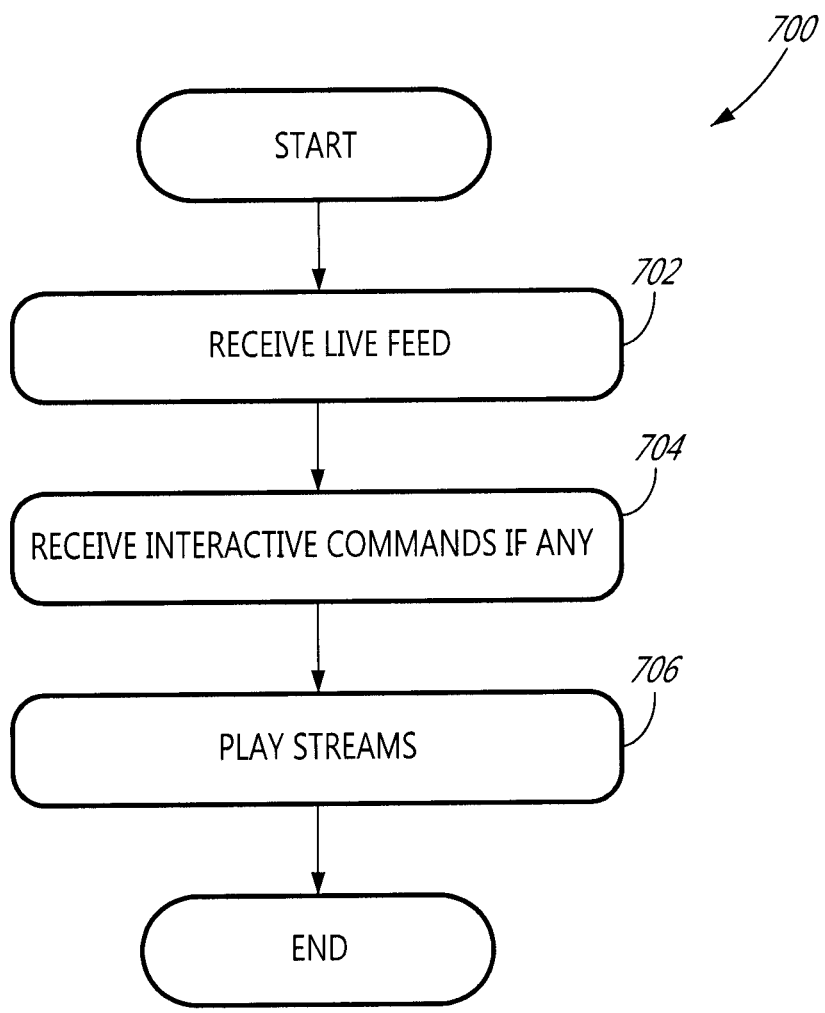

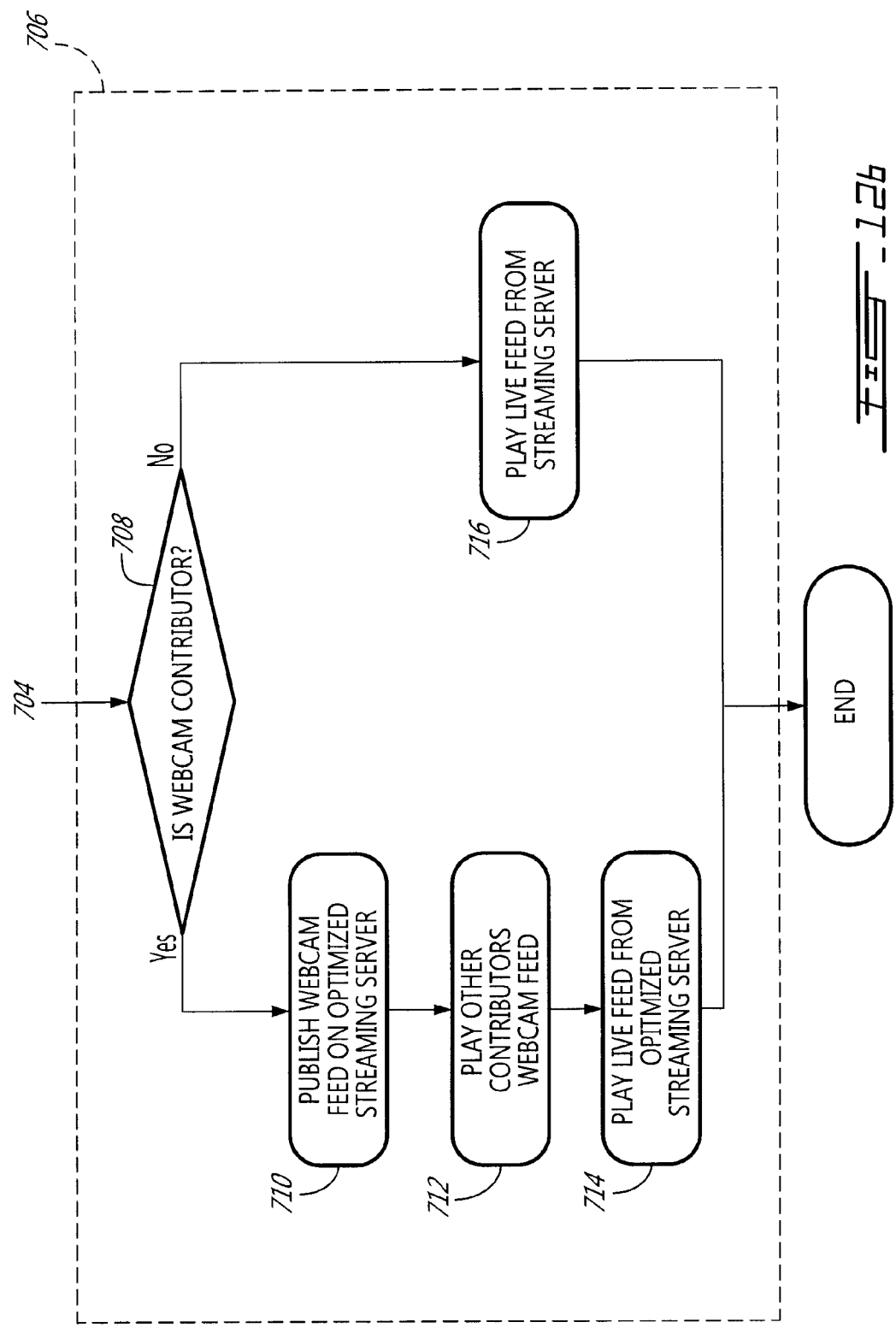

SYSTEM AND METHOD FOR BROADCASTING INTERACTIVE CONTENT

CROSS-REFERENCE TO RELATED APPLICATIONS

The present application is a US National Stage of International Application No. PCT/CA2013/000765, filed on Sep. 6, 2013, which claims priority under 35 USC §119(e) of U.S. Provisional Patent Application Ser. No. 61/697,461, filed on Sep. 6, 2012, the contents of which are hereby incorporated by reference.

TECHNICAL FIELD

The application relates generally to system and method for broadcasting live interactive events.

BACKGROUND OF THE ART

With the advent of the Internet, various interactive tools are now available to allow the interaction of audience members during the webcast of an event. For instance, with television systems switching from analog to digital and using devices, such as set-top boxes, user interaction has significantly increased. Still, regardless of the interactive tools being used, most existing systems for broadcasting live content have static interfaces that cannot be reconfigured dynamically. In addition, video content is usually provided separately from any other type of content using a different platform and must therefore be managed separately. This also presents challenges with regards to synchronizing the live broadcast content with the other types of content.

There is therefore a need for an improved system and method for broadcasting interactive content.

SUMMARY

In accordance with a first broad aspect, there is provided a system for streaming content to a plurality of devices over a network, the system comprising a memory; a processor; and a first application, a second application, and a third application stored in the memory, the first application executable by the processor for receiving from a first source a first stream comprising a first live feed and sending the first stream to the second application, the second application executable by the processor for receiving from the first application the first stream, receiving from a second source a second stream comprising a second live feed, extracting the first live feed from the first stream and the second live feed from the second stream, synchronizing the first live feed with the second live feed, generating a third stream comprising the synchronized first live feed and second live feed, and sending the third stream to the third application, and the third application executable by the processor for receiving from the second application the third stream and sending the third stream to each one of the plurality of devices.

Still further in accordance with the first broad aspect, the first application is executable by the processor for receiving from a contributing one of the plurality of devices a request signal indicative of a request to share the first live feed, approving the request, and receiving from the contributing device the first stream comprising the first live feed, and the third application is executable by the processor for sending the third stream to each one of the plurality of devices other than the contributing device.

Still further in accordance with the first broad aspect, the first application is executable by the processor for receiving the request signal indicative of a request to share the first live feed comprising at least one of a webcam feed, a desktop sharing feed, and a whiteboard feed.

Still further in accordance with the first broad aspect, the second application is executable by the processor for sending the second stream to the first application and the first application is executable by the processor for receiving the second stream from the second application and sending the second stream to the contributing device for rendering thereon the second live feed concurrently with the first live feed.

Still further in accordance with the first broad aspect, the third application is executable by the processor for sending the third stream to each one of the plurality of devices other than the contributing device comprising copying the third stream into a plurality of copied streams and transmitting, after a predetermined time delay, each one of the plurality of copied streams to each one of the plurality of devices other than the contributing device for rendering thereon of the synchronized first live feed and second live feed.

Still further in accordance with the first broad aspect, the memory has stored therein on-demand content and a fourth application executable by the processor for receiving a command signal indicative of a command to integrate the on-demand content to the second live feed and sending the command signal to the second application, the second application is executable for receiving the command signal, embedding into the second live feed at least one synchronization pulse indicative of a timing at which the on-demand content is to be integrated to the second live feed, and outputting to the third application a first control signal comprising the at least one embedded synchronization pulse.

Still further in accordance with the first broad aspect, the fourth application is further executable for outputting to each one of the plurality of devices a second control signal comprising instructions for causing the on-demand content to be retrieved from the memory, the first control signal to be obtained from the third application, the at least one synchronization pulse to be extracted from the first control signal, and the retrieved on-demand content to be integrated to the second live feed in accordance with the timing from the at least one synchronization pulse.

Still further in accordance with the first broad aspect, the memory has stored therein the on-demand content comprising at least one of text, images, videos, animations, presentations, surveys, and voting results.

Still further in accordance with the first broad aspect, the fourth application is executable by the processor for receiving at least one interactive command indicative of a request to integrate at least one of a plurality of interactive tools to the second live feed and for outputting to each one of the plurality of devices a third control signal comprising instructions for causing the at least one of the plurality of interactive tools to be launched on each one of the plurality of devices concurrently with rendering of the third stream on each one of the plurality of devices.

Still further in accordance with the first broad aspect, the fourth application is executable for causing the launch of the at least selected one of the plurality of interactive tools comprising at least one of a question bar, a chatbox, a voting bar, an evaluation bar, and a web browser.

In accordance with a second broad aspect, there is provided a computer-implemented method for streaming content to a plurality of devices over a network, the method comprising executing on a processor program code for receiving from a first source a first stream comprising a first live feed; receiving from a second source a second stream comprising a second live feed; extracting the first live feed from the first stream and the second live feed from the second stream; synchronizing the first live feed with the second live feed; generating a third stream comprising the synchronized first live feed and second live feed; and sending the third stream to each one of the plurality of devices.

Still further in accordance with the second broad aspect, the method further comprises receiving from a contributing one of the plurality of devices a request signal indicative of a request to share the first live feed, approving the request, receiving from the first source the first stream comprising the first live feed comprises receiving the first stream from the contributing device, and sending the third stream comprises sending after a predetermined time delay the third stream to each one of the plurality of devices other than the contributing device for rendering thereon of the synchronized first live feed and second live feed.

Still further in accordance with the second broad aspect, the method further comprises receiving a command signal indicative of a command to integrate to the second live feed on-demand content stored in memory, embedding into the second live feed at least one synchronization pulse indicative of a timing at which the on-demand content is to be integrated to the second live feed, and outputting to each one of the plurality of devices a first control signal comprising instructions for causing the on-demand content to be retrieved from the memory and the retrieved on-demand content to be integrated to the second live feed in accordance with the timing from the at least one synchronization pulse.

Still further in accordance with the second broad aspect, the method further comprises receiving at least one interactive command indicative of a request to integrate at least one of a plurality of interactive tools to the second live feed and outputting to each one of the plurality of devices a second control signal comprising instructions for causing the at least one of the plurality of interactive tools to be launched on each one of the plurality of devices concurrently with rendering of the third stream on each one of the plurality of devices.

In accordance with a third broad aspect, there is provided a computer readable medium having stored thereon program code executable by a processor for streaming content to a plurality of devices over a network, the program code executable for receiving from a first source a first stream comprising a first live feed; receiving from a second source a second stream comprising a second live feed; extracting the first live feed from the first stream and the second live feed from the second stream; synchronizing the first live feed with the second live feed; generating a third stream comprising the synchronized first live feed and second live feed; and sending the third stream to each one of the plurality of devices.

In accordance with a fourth broad aspect, there is provided a system for integrating interactive content to a live feed for broadcasting to a plurality of devices over a network the system comprising a memory having stored therein a plurality of interactive content; a processor; and at least one application stored in the memory and executable by the processor for presenting an interface on each one of the plurality of devices, receiving the live feed from a first source, generating a first stream comprising the live feed, sending the first stream to each one of the plurality of devices for causing the live feed to be displayed within the interface, receiving a request signal indicative of a request for at least one of the plurality of interactive content, sending to each one of the plurality of devices a control signal comprising instructions for retrieving the at least one of the plurality of interactive content from the memory, and dynamically modifying the interface for causing the retrieved at least one of the plurality of interactive content to be displayed within the interface concurrently with the live feed.

Still further in accordance with the fourth broad aspect, the at least one application is executable by the processor for dynamically modifying the interface by integrating the retrieved at least one of the plurality of interactive content to the live feed in accordance with at least one synchronization pulse embedded in the first stream, the at least one synchronization pulse indicative of a timing at which the at least one of the plurality of interactive content is to be integrated to the live feed.

Still further in accordance with the fourth broad aspect, the at least one application is executable by the processor for dynamically modifying the interface by displaying the retrieved at least one of the plurality of interactive content within at least a first frame of the interface and concurrently displaying the live feed within a second frame of the interface.

Still further in accordance with the fourth broad aspect, the memory has stored therein the plurality of interactive content comprising at least one of text, images, videos, animations, presentations, surveys, and voting results.

Still further in accordance with the fourth broad aspect, the memory has stored therein a plurality of interactive tools and the at least one application is executable by the processor for receiving the request signal indicative of a request for at least one of the plurality of interactive tools and for sending the control signal comprising instructions for causing the at least one of the plurality of interactive tools to be launched on each one of the plurality of devices within the at least first frame.

Still further in accordance with the fourth broad aspect, the memory has stored therein the plurality of interactive tools comprising at least one of a question bar, a chatbox, a voting bar, an evaluation bar, and a web browser.

Still further in accordance with the fourth broad aspect, the at least one application is executable by the processor for receiving the request signal indicative of a request to integrate shared content received from a contributing one of the plurality of devices to the live feed, synchronizing the live feed with the shared content, generating a second stream comprising the synchronized live feed and shared content, and dynamically modifying the interface presented on each one of the plurality of devices other than the contributing device by sending the second stream to each one of the plurality of devices other than the contributing device for display of the synchronized live feed and shared content within the interface of each one of the plurality of devices other than the contributing device.

Still further in accordance with the fourth broad aspect, the at least one application is executable by the processor for receiving the request signal indicative of a request for the shared content comprising at least one of webcam content, desktop sharing content, and whiteboard content.

In accordance with a fifth broad aspect, there is provided a computer-implemented method for integrating interactive content to a live feed for broadcasting to a plurality of devices over a network, the method comprising executing on a processor program code for presenting an interface on each one of the plurality of devices; receiving the live feed from a first source; generating a first stream comprising the live feed; sending the first stream to each one of the plurality of devices for causing the live feed to be displayed within the interface; receiving a request signal indicative of a request for at least one of a plurality of interactive content stored in memory; sending to each one of the plurality of devices a control signal comprising instructions for retrieving the at least one of the plurality of interactive content from the memory; and dynamically modifying the interface for causing the retrieved at least one of the plurality of interactive content to be displayed within the interface concurrently with the live feed.

Still further in accordance with the fifth broad aspect, dynamically modifying the interface comprises integrating the retrieved at least one of the plurality of interactive content to the live feed in accordance with at least one synchronization pulse embedded in the first stream, the at least one synchronization pulse indicative of a timing at which the at least one of the plurality of interactive content is to be integrated to the live feed.

Still further in accordance with the fifth broad aspect, dynamically modifying the interface comprises displaying the retrieved at least one of the plurality of interactive content within at least a first frame of the interface and concurrently displaying the live feed within a second frame of the interface.

Still further in accordance with the fifth broad aspect, the method further comprises receiving the request signal indicative of a request for at least one of a plurality of interactive tools and sending the control signal comprising instructions for causing the at least one of the plurality of interactive tools to be launched within the at least first frame.

Still further in accordance with the fifth broad aspect, the method further comprises receiving the request signal indicative of a request to integrate shared content received from a contributing one of the plurality of devices to the live feed, synchronizing the live feed with the shared content, generating a second stream comprising the synchronized live feed and shared content, and dynamically modifying the interface presented on each one of the plurality of devices other than the contributing device by sending the second stream to each one of the plurality of devices other than the contributing device for display of the synchronized live feed and shared content within the interface of each one of the plurality of devices other than the contributing device.

In accordance with a sixth broad aspect, there is provided a computer readable medium having stored thereon program code executable by a processor for integrating interactive content to a live feed for broadcasting to a plurality of devices over a network, the program code executable for presenting an interface on each one of the plurality of devices; receiving the live feed from a first source; generating a first stream comprising the live feed; sending the first stream to each one of the plurality of devices for causing the live feed to be displayed within the interface; receiving a request signal indicative of a request for at least one of a plurality of interactive content stored in memory; sending to each one of the plurality of devices a control signal comprising instructions for retrieving the at least one of the plurality of interactive content from the memory; and dynamically modifying the interface for causing the retrieved at least one of the plurality of interactive content to be displayed within the interface concurrently with the live feed.

DESCRIPTION OF THE DRAWINGS

Reference is now made to the accompanying figures in which:

FIG. 1 is a schematic diagram of a system for streaming live multimedia content to a large audience, in accordance with an illustrative embodiment;

FIG. 2a is a schematic diagram of the live broadcasting system of FIG. 1;

FIG. 2b is a schematic diagram of the Application Program Interface of FIG. 2a;

FIG. 2c is a schematic diagram of a set of server instances, in accordance with an illustrative embodiment;

FIG. 3 is a schematic diagram illustrating how interactive content is broadcasted by the live broadcasting system of FIG. 1;

FIG. 4 is a schematic diagram illustrating the operation of the encoder system of FIG. 2a during a webcam interaction;

FIG. 5a is a schematic diagram of the live broadcasting system of FIG. 1 streaming a live broadcast to the client devices;

FIG. 5b is a schematic diagram of the live broadcasting system of FIG. 1 streaming to the client devices interactive content along with a live broadcast;

FIG. 5c is a schematic diagram of the live broadcasting system of FIG. 1 streaming to the client devices a webcam feed along with a live broadcast;

FIG. 6 is a schematic diagram illustrating how a recorded broadcast may be played back by a viewer;

FIG. 7 is a schematic diagram of an administrator graphical user interface in accordance with an illustrative embodiment;

FIG. 10 is a schematic diagram of a graphical user interface of audience members other than the webcam contributor of FIG. 8;

FIG. 11a is a flowchart of a method for streaming a webcam or screen sharing feed to a large audience as seen from the point of view of the encoder system of FIG. 2a;

FIG. 12a is a flowchart of a method for streaming a webcam or screen sharing feed to a large audience as seen from the point of view of the contributor; and FIG. 12b is a flowchart of the step of FIG. 12a of playing streams.

DETAILED DESCRIPTION

Figure 8:
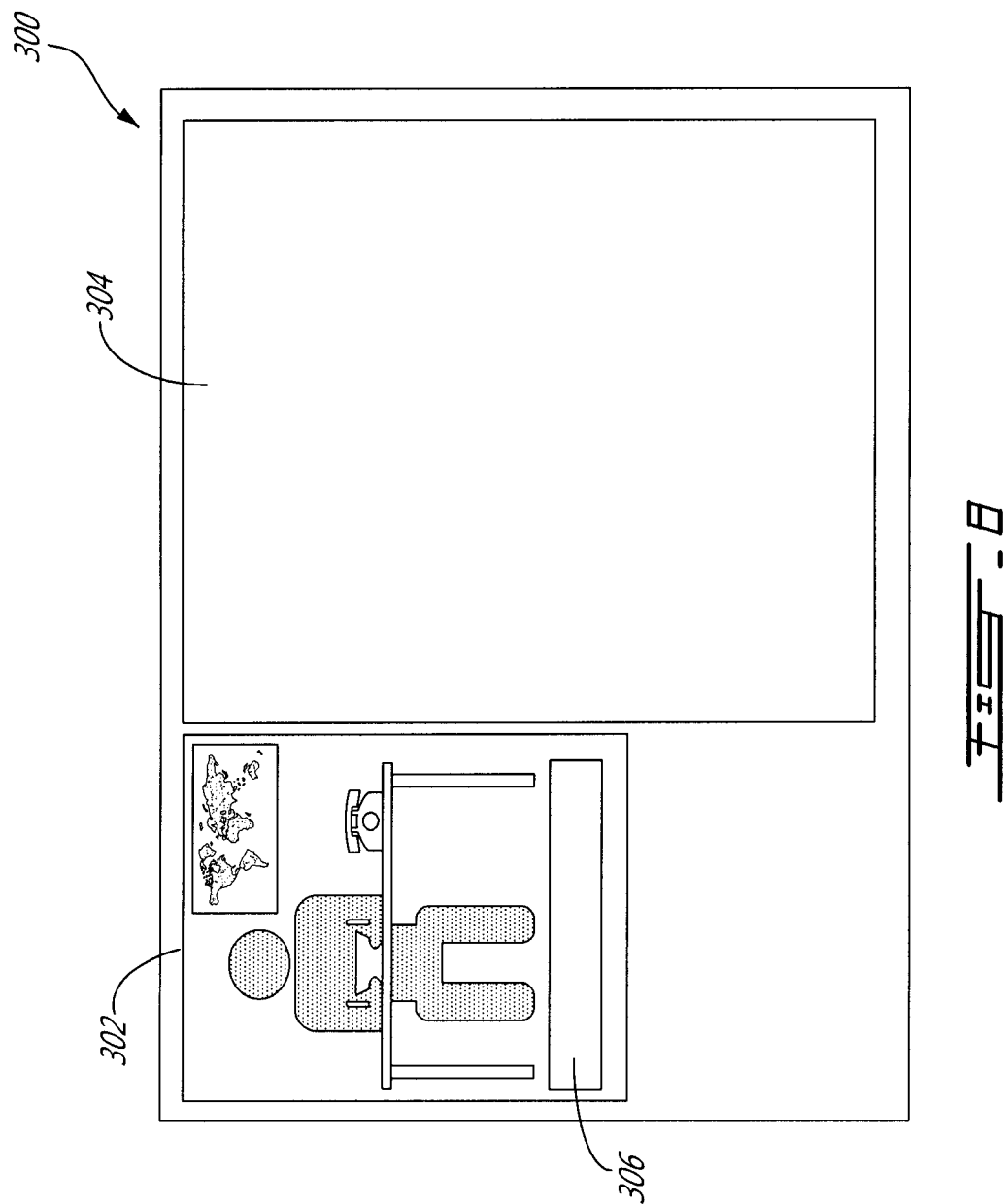
FIG. 8 is a schematic diagram of an audience member graphical user interface in accordance with an illustrative embodiment.

Referring to FIG. 1, there is illustrated a system 100 for streaming live multimedia content to a large audience. Although the description below refers to streaming live content, it should be understood that the system 100 may also enable users to stream pre-recorded content. The audience comprises users of a plurality of client devices 102, which are adapted to communicate with a live broadcasting system 104 over a network 106. Again, it should be understood that although a live broadcasting system 104 is described herein, the system 104 may be used to broadcast live or pre-recorded content. The client devices 102 may comprise any device, which is configured to communicate over the network 106, such as the Internet, the Public Switch Telephone Network (PSTN), a cellular network, or others known to those skilled in the art. Examples of the client devices 102 include, but are not limited to desktop personal computers, laptop computers, tablet computers, personal digital assistants (PDA), and smart phones. The client devices 102 illustratively run a browsing program, such as Microsoft's Internet Explorer™, Mozilla Firefox™, Safari™, or a Wireless Application Protocol (WAP) enabled browser in the case of a smart phone or PDA. The client devices 102 may also include one or more interface devices, such as a keyboard, a mouse, a touchscreen, a webcam, and the like (not shown), for interacting with a graphical user interface (GUI) (not shown) presented on each device 102 when the latter accesses the live broadcasting system 104.

Although illustrated as being separate and remote from the client devices 102, it should be understood that the live broadcasting system 104 may be integrated with the devices 102, either as a downloaded software application, a firmware application, or a combination thereof. In one embodiment, each client device 102 uses their browsing program to launch a web application providing access to the live broadcasting system 104 over the network 106. Once the web application associated with the client device 102 is launched, the web application may create the GUI and present thereon media content associated with a live broadcast. Although the description below refers to a single web application being launched within each client device 102, it should be understood that more than one web application may be launched within a single client device 102. In this case, each web application accesses the live broadcasting system 104 independently from the other web applications launched within the same client device 102.

Access to the media content may be restricted to registered users only and, as such, a user of the client device 102 may be required to register with the system 104 prior to being granted access to the media content. For this purpose, the user may complete an application, thereby creating a unique profile. This may be done by accessing a website associated with the live broadcasting system 104 using the browsing program of the device 102. Once registration is completed, the system 104 provides the user with a unique identifier, e.g. a username and password, associated with their profile. The streaming content may then be accessed by the client device 102 upon the user identifying him/herself via the unique identifier. Moreover, various levels of access rights may be provided to the users and some users may be prevented from having access to a given content on the basis of their profile information. For example, users below the legal age may not be allowed access to mature content.

Referring to FIG. 2a, the live broadcasting system 104 illustratively receives a live feed from a switch 108 and comprises an encoder system 110, a streaming server 112, an optimized streaming server 114, an interactive applications server 116, and an Application Program Interface (API) 118.

Video and audio signals from a live event recorded in a broadcast studio (not shown) are illustratively received at the switch 108 over lines 120 and 121 respectively. It should however be understood that the live event may be recorded outside of the broadcast studio, such as outdoors in the case of live coverage of a sporting event, a concert, or other live event. The switch 108 illustratively serves as a link between the broadcast studio and the system 104 and enables an administrator to control the scenes to be broadcast as well as the schedule thereof. For this purpose, the switch 108 switches between cameras recording the live event. The switch 108 may be a Broadcast Pix™ switcher or any other suitable switch.

The switch 108 outputs a main stream, which comprises the live broadcast feed. The main stream (or live feed) is then sent to the encoder system 110, which formats the stream for subsequent transmission to the client devices 102 over the network 106. For this purpose, the encoder system 110 illustratively digitizes and encodes the received stream into a data format appropriate for streaming to the client devices 102. The content can be encoded using any suitable format or technique including, but not limited to, Audio Video Interleave (AVI), Windows Media, MPEG4, Quicktime, Real Video, and ShockWave/Flash. The encoder system 110 illustratively encodes the stream at multiple bit rates to subsequently enable the streaming servers 112, 114 to select the bit rate most suitable for the bandwidth of each one of the client devices 102. The encoded signal is then sent to the streaming server 112, which may deliver a multiplexed stream for rendering on the GUI of each client device 102. In particular, the streaming server 112 illustratively redistributes the stream in multicast to all client devices 102 with the same stream being copied and simultaneously transmitted to each client device 102. For a large audience, the signal may be delayed by a few seconds, e.g. five (5) seconds, due to the heavy load on the streaming server 112. As a result, this broadcast delay may add up resulting in a desynchronization between the moment the live event is captured at the studio and the moment the stream is delivered to the client devices 102.

When a user of a client device 102 wishes to contribute to the live event by broadcasting their webcam, the switch 108 illustratively transmits to the optimized streaming server 114 the main stream comprising the live broadcast feed. The optimized streaming server 114 may then generate a single stream, which is transmitted in real time, i.e. without introducing any broadcasting delay, to the contributing client device 102. As will be discussed further below, the optimized streaming server 114 may also transmit the webcam feed from the client device 102 to the encoder system 110 so the latter may combine the webcam feed to the main stream to generate the multiplexed stream to be sent to the remaining client devices 102.

The streaming servers 112 and 114 illustratively use a scalable architecture in order to adapt to the size of the audience of client devices 102 and accordingly to the influx of connections from the client devices 102. For this purpose, the streaming servers 112 and 114 are designed to internally expand as demand increases, as will be discussed further below. Both the streaming server 112 and the optimized streaming server 114 may comprise one or more servers. Also, although the servers 112 and 114 have been illustrated as being separate server components, they may be implemented as separate streaming applications of a single server. The streaming servers 112 and 114 illustratively use a server software, such as the Wowza Media Server™ software or any other suitable software, which allows streaming of live multimedia content to multiple types of client devices as in 102 simultaneously.

On-demand multimedia content may further be streamed to the client devices 102 along with the live content. The on-demand content may comprise the broadcaster's own content, such as text, images, videos, animations, presentations, surveys, and other documents created in advance of broadcasting live events and related thereto. The on-demand content may be in any suitable format, such as Java™, Flash™, PowerPoint™, PDF™, and the like. Toll-free call-numbers may also be presented as on-demand content to prompt users to place a phone call for the purpose of asking specific questions to the presenter for instance. The on-demand content may also comprise live content, such as voting or survey results, desktop sharing content, and whiteboard content, which may be generated during the live broadcast. For example, the desktop of a user or that of a presenter of the live broadcast may be shared with all members of the audience. An interactive whiteboard may also be shared among audience members.

As will be discussed further below, using the interactive applications server 116, the broadcaster may send an interactive command to all client devices 102, the command indicating which on-demand content is to be displayed on the devices 102 and the source address to get the content. Upon being received at each client device 102, the interactive command is illustratively interpreted and the content displayed while the live broadcast stream is played. Users may therefore view the on-demand content simultaneously as they are viewing the live broadcast content, the content being viewed within the GUI created by the web application associated with each client device 102. For this purpose, the GUI of each one of the client devices 102 is illustratively compatible with a suitable multimedia software/stream player, such as Flash Player™ 11.2 or the like. In addition, the appearance of the GUI and the content presented therein may be controlled dynamically and in real time by the Interactive applications server 116. In this manner, it becomes possible to modify the content presented to users according to broadcast needs.

For example, when it is desired to present the on-demand content or to load a given virtual interactive tool, such as present a question bar, or open a chat box, on the GUI of the client devices 102 to enable user interaction, the interactive applications server 116 may be used to indicate that on-demand content is being requested or to prompt each one of the client devices 102 to load the interactive tool. For this purpose, the interactive applications server 116 illustratively opens a bidirectional communication channel (not shown) with each client device 102 using the Real Time Messaging Protocol (RTMP) protocol or any other suitable protocol known to those skilled in the art. The interactive applications server 116 may be a RED5™ server or any other suitable server type.

When it is desired to control the access of the client devices 102 to the broadcast content being streamed thereto, the Application Program Interface (API) 118 may be used. In particular, a client device 102 attempting to connect to the system 104 may be required to authenticate itself through the API 118. Authentication may be effected using the unique identifier associated with the user's profile created upon registration. In this manner, it can be ensured that only registered users having the proper authority level may access the broadcasted content. It should be understood that the system 104 may use an API from a social networking service, such as Facebook™ or Twitter™, with which the user of the client device 102 is registered. In this case, prior to being provided access to the stream from the streaming server 112, the user may be required to log in using an identifier, e.g. username and password, associated with their social network account, thereby performing identity verification.

Referring to FIG. 2b, the API 118 illustratively comprises an elastic web-service module 118a, a cloud listener web-service module 118b, and a login web-service module 118c.

The elastic web-service module 118a illustratively allows a broadcast administrator accessing the system 104 via a broadcaster manager module 122 to create a broadcasting session. In particular, the broadcaster manager module 122 illustratively connects to the elastic web-service module 118a and provides parameters, such as a broadcast name and a minimum-maximum audience number, to create the broadcast. Upon receiving the parameters from the broadcast manager module 122, the elastic web-service module 118a may start a method call that creates the minimal set of instances of the streaming server 112, the optimized streaming server 114, and the interactive application server 116 necessary to start the broadcasting session. The server instances may be created on the network 106, which comprises in one embodiment an Amazon™ cloud. A detailed description of the created instances may then be saved by the elastic web-service 118a into memory, e.g. into the databases 130.

Referring to FIG. 2c in addition to FIG. 2b, the minimal set of server instances illustratively comprises at least one interactive applications server 116, a main streaming server or load balancer 124a, and at least one edge streaming server or cloned repeater as in 124b, 124c. When the traffic is heavy, the main streaming server 124a illustratively redirects the load to the edge streaming servers 124b, 124c, which experience lighter traffic. Each one of the main streaming server 124a and the edge streaming servers 124b, 124c illustratively comprises a streaming server as in 112a, 112b, and 112c and an optimized streaming server as in 114a, 114b, and 114c. The number of interactive applications server 116 and edge streaming servers as in 124b, 124c may be selected according to the minimum audience number provided to the elastic web-service 118a by the broadcaster manager 122. The number of interactive applications servers 116 and edge streaming servers as in 124b, 124c may therefore be adapted to the size of the audience with more servers being provided when a larger audience accesses the system 104.

Referring back to FIG. 2b, the cloud listener web-service module 118b illustratively handles changes to the network 106 by allowing to create server instances based on customizable images or any other suitable approach. The Amazon™ Web Services (AWS) cloud manager system, which uses Amazon™ Machine Images (AMI), may be used. Any other suitable system known to those skilled in the art may also apply. The cloud listener webservice module 118b further allows to define auto-scaling policies and generates alerts that may be handled by the elastic web-service module 118a. For example, an auto-scaling policy may comprise creating a new instance from the WOWZA™ Edge Amazon Image (AMI) if an instance from the edge streaming server group reaches 80% of central processing unit (CPU) usage. The cloud listener web-service module 118b may also generate alerts, using Amazon™ Simple Notification Service (SNS) messages or the like, as to these changes by calling a predetermined cloud listener address. The new server descriptions may be stored in the databases 130. In this manner, a new user trying to connect to the system 104 via the login web-service 118c discussed below will illustratively be connected to the newly created server instances rather than heavily loaded ones.

The login web-service module 118c illustratively provides members of the audience access to the system 104 using their devices 102. For this purpose, users may connect to the system 104 via an interactive platform module 123 comprising an interactive application client module 119a and a stream player module 119b (see FIG. 2c). In particular, once a broadcast session is created and started, a session login and password may be generated and communicated to the audience members wishing to access the live broadcast. Client devices as in 102 will then be able to connect to an existing session by calling the login web-service module 118c with the session login and password. The login web-service module 118c will then illustratively retrieve the description of the broadcast servers from the databases 130 and connect the interactive platform module 123 with the least loaded server instances of the streaming server 112, the optimized streaming server 114, and the interactive applications server 116.

Referring back to FIG. 2a and to FIG. 1, the encoder system 110 may comprise, amongst other things, a plurality of applications 125a . . . 125n running on a processor 126 coupled to a memory 128. It should be understood that while the applications 125a . . . 125n presented herein are illustrated and described as separate entities, they may be combined or separated in a variety of ways.

One or more databases 130 may be integrated directly into the memory 128 or may be provided separately therefrom and remotely from the encoder 110 (as illustrated in FIG. 1). In the case of a remote access to the databases 130, access may occur via any type of network 106, as indicated above. The various databases 130 described herein may be provided as collections of data or information organized for rapid search and retrieval by a computer. The databases 130 may be structured to facilitate storage, retrieval, modification, and deletion of data in conjunction with various data-processing operations. The databases 130 may consist of a file or sets of files that can be broken down into records, each of which consists of one or more fields. Database information may be retrieved through queries using keywords and sorting commands, in order to rapidly search, rearrange, group, and select the field. The databases 130 may be any organization of data on a data storage medium, such as one or more servers.

In one embodiment, the databases 130 are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL).

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), SSH (Secure Shell Remote Protocol).

The memory 128 accessible by the processor 110 may receive and store data. The memory 128 may be a main memory, such as a high speed Random Access Memory (RAM), or an auxiliary storage unit, such as a hard disk, flash memory, or a magnetic tape drive. The memory 128 may be any other type of memory, such as a Read-Only Memory (ROM), Erasable Programmable Read-Only Memory (EPROM), or optical storage media such as a videodisc and a compact disc.

The processor 126 may access the memory 128 to retrieve data. The processor 126 may be any device that can perform operations on data. Examples are a central processing unit (CPU), a front-end processor, and a microprocessor. The applications 125a . . . 125n are coupled to the processor 126 and configured to perform various tasks as explained below in more detail.

Although not illustrated, it should be understood that each one of the streaming server 112, the optimized streaming server 114, and the interactive applications server 116 may also comprise, amongst other things, a plurality of applications running on a processor coupled to a memory (not shown) and configured to perform the various tasks implemented by the streaming server 112, the optimized streaming server 114, and the interactive applications server 116.

FIG. 3 illustrates in more detail the manner in which interactive content is broadcasted, i.e. delivered and synchronized on each client device 102. In particular, FIG. 3 shows that, on the client side, the interactive platform 123 is the web application providing the platform GUI on each client device 102 whereas, at the administrator's side, the interactive platform 123 is used to manage streams coming from contributors. Each interactive platform as in 123 illustratively comprises a cue organizer module 132. The cue organizer module 132 illustratively receives a request for on-demand content from the interactive applications server 116. The cue organizer module 132 may then process the received media content to generate a signal that will be subsequently transmitted to the streaming server 112 for access by the client devices 102.

FIG. 4, which will be discussed in further detail below, illustrates the manner in which the encoder system 110 operates to multiplex a webcam feed with the live feed program during a webcam interaction.

When the received data comprises on-demand content, it may be desirable to synchronize the on-demand content with the live feed. Indeed, although the live feed may be received with a five (5) seconds delay, as discussed above, on-demand content, such as text, may be received instantly because such content is lighter than the live video stream being broadcasted. In order to synchronize the on-demand data with the live feed, the cue organizer module 132 illustratively inserts synchronization pulses into the signal received. The synchronization pulses may be inserted as cue points embedded in the signal. In particular, the cue points may be embedded into stream frames of the live feed using a Flash™ media server and HTTP web-service technology or any other suitable technology known to those skilled in the art. The cue points enable to attach information about interactive components and actions that should be associated with specific video frames. The body of the cue points illustratively specifies the command that should be displayed at given moments of the stream.

The output of the cue organizer module 132 is illustratively a metadata signal comprising the cue points used to enable synchronization of the multimedia content to be presented on the client devices 102. This metadata signal is then sent to the streaming server 112 to be encoded and streamed to each one of the client devices 102. The stream is illustratively received from the streaming server 112 at the stream player module 119b of each client device 102. Upon receiving the stream, the web application within each client device 102, e.g. the interactive platform 123, and more particularly the cue organizer module 132, illustratively decodes the cue points embedded within the stream in order to synchronize the on-demand content with the live broadcast feed. In particular, the web application is able to determine from the cue points when to integrate (e.g. display concurrently and in synchronism with) a given on-demand content to the live feed. For this purpose, the cue organizer module 132 illustratively receives from the interactive application client module 119a at the client device 102 interactive commands indicating that content and an associated video frame is to be retrieved from the databases 130. The cue organizer module 132 thus retrieves the content and the appropriate display can be automatically generated on the viewer's side in accordance with the cue points.

Referring now to FIG. 5a, the system 100 may comprise a plurality of client devices 102, such as the client devices 102$_1$ and 102$_2$, accessing the live broadcast and an administrator client device 102$_A$ responsible for managing the broadcast and user interactions. Although only two (2) client devices $102_1$ and $102_2$ are shown for the sake of clarity, it should be understood that more client devices 102 may access the system 104 at once. It should also be understood that the system 100 may comprise more than one administrator client device $102_A$.

When a live broadcast is to be streamed to the client devices $102_1$ and $102_2$ that have logged in to the system 104, the administrator client device $102_A$ illustratively sends a control signal to this effect to the interactive applications server 116. Alternatively, a client device $102_1$ or $102_2$ may directly request access to the live broadcast by sending a request signal to the interactive applications server 116. Upon receiving the control signal from the administrator client device $102_A$ or the request signal from the client device $102_1$ or $102_2$, the interactive applications server 116 sends a request for the live broadcast stream to the encoder system 110. The encoder system 110 then determines whether the stream is available for broadcast, i.e. whether it is done generating the stream and the stream has been transmitted to the streaming server 112. Once the stream is ready for broadcast, the encoder system 110 sends a return signal to the interactive applications server 116 to indicate that the stream may now be accessed by the client devices $102_1$ and $102_2$. The interactive applications server 116 receives the return signal from the encoder system 110 and in turn instructs the web application in each one of the client devices $102_1$ and $102_2$ to connect to the streaming server 112 to access the stream. Upon the client devices $102_1$ and $102_2$ connecting to the streaming server 112, the live broadcast may then be presented on the GUI of each one of the client devices $102_1$ and $102_2$. Although not illustrated, the administrator client device $102_A$ and the broadcast manager 122 may also connect to the streaming server 112 to receive the stream for quality control and monitoring purposes.

Referring now to FIG. 5b in addition to FIG. 3, on-demand media content may be displayed in real time on the GUI of each one of the client devices $102_1$ and $102_2$ simultaneously with the live broadcast content. For example, presentations, images, animations, videos, surveys, quizzes, or other documents may be created in advance of broadcasting the live event and stored in the databases 130 and/or the memory 128. If the system administrator wishes to integrate the pre-stored content to the live broadcast, the administrator client device $102_A$, and more particularly the interactive application module 119a of the interactive platform 123, may send a control signal comprising interactive commands to the interactive applications server 116. This control signal is indicative that the pre-stored content is to be retrieved from the databases 130 and/or the memory 128 for display at the client devices $102_1$ and $102_2$ while the live broadcast stream is played.

Upon receiving the control signal, the interactive applications server 116 may transfer the interactive commands to the interactive platform 123 at the client side. The cue organizer module 132 at the client side then retrieves the desired content from the databases 130 and/or the memory 128. The encoder system 110 may also send the main stream received from the switch 108 to the streaming server 112. The streaming server 112 may then transmit the stream comprising the video content to the interactive platform 123 on each one of the client devices $102_1$ and $102_2$ connected to the streaming server 112. The cue organizer module 132 may further decode the cue points embedded in the stream, as discussed above, in order to allow rendering of the on-demand media content along with the live broadcast on the GUI of the client devices $102_1$ and $102_2$. As will be described further below, when additional content, such as on-demand media content, is being presented on the GUI simultaneously with the live broadcast content, the contents are illustratively presented within separate frames of the GUI with the on-demand media content being presented "on the side". It should be understood that other configurations may apply.

Still referring to FIG. 5b in addition to FIG. 3, the system administrator may further wish to launch (e.g. activate and display) a variety of virtual interactive tools on the client devices $102_1$ and $102_2$ during the live broadcast. For example, it may be desirable for a question bar or a chat box to be launched within the GUI of each one of the client devices $102_1$ and $102_2$ to allow members of the audience to interact. Using the question bar, users may type questions they wish to ask to the presenter of the live broadcast. Using the chat box, users may exchange messages with the presenter or with one another, either publicly or privately. It may also be desirable to launch a voting "Yes/No" bar or an evaluation "1 to 5" bar within the GUI to enable users to provide feedback on a topic related to the live broadcast at hand. Moreover, it may be desirable to launch a web browser within the GUI. In this manner, each user of the client devices $102_1$ and $102_2$ may navigate the Internet while viewing the live broadcast stream and this without leaving the GUI. Users may indeed be prompted by the presenter to visit a given webpage that contains information related to the live broadcast.

In order to have the above-mentioned interactive tools launched within the GUI of the client devices $102_1$ and $102_2$, the administrator client device $102_A$ may send a control signal, i.e. interactive commands, to the interactive applications server 116 in a similar manner as when on-demand content is to be displayed. The control signal may indicate to each one of the client devices $102_1$ and $102_2$ the specific interactive tool to be launched. Upon receiving the control signal, the interactive applications server 116 may then instruct the web application in each one of the clients $102_1$ and $102_2$ to launch the specified interactive tool. Upon being opened by the web application, the desired interactive tool may then be presented to the users within the GUI of client devices $102_1$ and $102_2$. In the case of a web browser, the browsing window may upon being opened display a webpage, e.g. the presenter's website, specified by the system administrator. Still, it should be understood that users may also navigate to other webpages by entering an address thereof into an editable address bar provided in the browsing window. The browsing window may further comprise scroll bars and other control icons as well as include one or more hyperlinks enabling users to navigate to various webpages over the network 106.

User feedback, responses to polling questions, quizzes, and other elements may further be generated "live" by each one of the client devices $102_1$ and $102_2$. Each user illustratively submits this feedback in real time to the system 104 using the interface devices of their client device $102_1$, $102_2$. For example, using a mouse, a user may respond to a quiz by selecting answers presented on the GUI of his/her client device $102_1$, $102_2$. These responses are received in real time by the system 104 and may be posted dynamically as they are received. The responses may for instance be presented on an output device, such as a screen provided in the broadcast studio adjacent the presenter. While the live event is being recorded, the responses received from the users are then recorded as well and they may be viewed in real time by the users. Alternatively, the responses may be presented on the GUI of the client devices $102_1$ and $102_2$ as media content presented concurrently with the live broadcast content in the manner discussed above Referring now to FIG. 5c in addition to FIG. 4, each user of the client devices $102_1$ and $102_2$ may become a contributor in the live broadcast. A client device $102_3$ may indeed connect and broadcast its webcam and have its webcam feed viewed by the other clients $102_1$ and $102_2$ simultaneously with the live event. This may for example be desirable when a user is being interviewed by the presenter of the live broadcast. It should be understood that a plurality of client devices as in $102_3$ may wish to broadcast their webcam by connecting to the optimized streaming server 114, as will be discussed below. It should also be understood that the user of the client device $102_3$ may also wish to share its computer screen or desktop as well as broadcast an interactive whiteboard. It should also be understood that although combination of a webcam feed with the live broadcast feed is described herein, live feeds from remote studios may similarly be combined with the live broadcast from the main studio.

If the system administrator allows such a feature, the user of the client device $102_3$ may signal his/her wish to share his/her webcam by selecting an option, such as clicking a pushbutton or the like, presented on the GUI of the client device $102_3$. Selection of the option may trigger transmission of a request signal to the administrator client device $102_A$. The request signal may also be sent to a call controller (not shown) responsible for controlling all incoming calls from members of the audience. It should be understood that the administrator client device $102_A$ may act as the call controller, as illustrated. The administrator client device $102_A$ may then approve or reject the request of the client device $102_3$ to share its webcam. A request may for instance be rejected if the user was slow in selecting the option and the time frame for the interview has elapsed. Upon receiving and approving the request signal, the administrator client device $102_A$ may then connect to the optimized streaming server 114 and send a signal thereto to indicate that the client device $102_3$ is wishing to share its webcam. The administrator client device $102_A$ may also send a signal to the client device $102_3$ to instruct the latter to disconnect from the streaming server and connect to the optimized streaming server 114.

Once the client device $102_3$ and optimized streaming server 114 are connected, the administrator client device $102_A$ may disconnect from the optimized streaming server 114 and the latter may receive the webcam feed from the client device $102_3$. The received webcam feed may then be sent from the optimized streaming server 114 to the encoder system 110. The optimized streaming server 114 may further receive the main stream comprising the live feed received from the studio from a live feed publisher 115 coupled to the encoder system 110 (see FIG. 4). Upon receiving the main stream, the optimized streaming server 114 may then generate a first single stream comprising the live feed that is broadcast to the client device $102_3$. The contributor webcam feed(s) may be sent in a second single stream generated by the optimized streaming server 114. Because the optimized streaming server 114 receives the main stream from the switch 108 in real time and the client device $102_3$ is the only device connected to the optimized streaming server 114, the real time webcam feed of the client device $102_3$ remains synchronized with the live broadcast feed received from the first single stream. Indeed, by separating the optimized streaming server 114 from the streaming server 112, webcam contributors are able to share their webcam feeds on a light streaming server, i.e. the optimized streaming server 114, and receive each other's feeds without delay while the remaining audience members connected to the heavily loaded streaming server 112 receive a stream having a five (5) seconds delay. In this manner, the webcam feed may be presented within the GUI of the client device $102_3$ concurrently with the live broadcast and the user may visualize his/her interaction with the presenter of the live broadcast without any time lag, thus enhancing the user's experience.

Upon receiving the webcam feed from the optimized streaming server 114, the encoder system 110 may further generate an encoded signal comprising both the live broadcast content and the received webcam feed. Using a remote controller application 125b (see FIG. 4), the encoder system 110 may be remotely prompted to generate the encoded signal by the web application provided in the administrator client device $102_A$. For this purpose, the web application may connect to a remote control socket and issue a command signal indicating that a new mixed video scene comprising the live broadcast signal and the webcam feed is to be created. The encoder system 110 may in turn generate the encoded signal. It should be understood that the remote control feature may be used to trigger other behaviors of the encoder system 110. For this purpose, the command signal may comprise instructions, such as "start recording", "stop recording", "compose a mixed scene", "switch scenes", and the like. The encoded signal is then transmitted to the streaming server 112, which generates a stream that is distributed to the client devices $102_1$ and $102_2$ with a broadcast delay, as discussed above. All users other than the user of the client device $102_3$ may therefore view the stream with a delay relative to the actual interaction.

Using the above-mentioned process in which different streams are sent to the webcam contributor and to other members of the audience who are not broadcasting their webcam, all users are able to view a synchronized interaction between the contributor and the presenter. Moreover, the bandwidth usage illustratively does not increase regardless of the number of webcam contributors. In one embodiment, this bandwidth is 500 kbps for standard-definition (SD) video and 755 kbps for high-definition (HD) video. In addition, the streaming server 112 and the optimized streaming server 114 illustratively use multi-bitrate streaming. The bandwidth of the client devices $102_1$, $102_2$ is indeed first detected in real time and the quality of the stream to be transmitted to the client device $102_1$, $102_2$ selected accordingly, thus further increasing the users' experience.

FIG. 6 is a schematic diagram illustrating how a recorded broadcast could be played back by a viewer. During a live broadcast, the cue organize module 132 keeps a record of each interactive command. At the end of the broadcast, all interactive commands are saved in an XML File (or any other suitable format) in databases 130. When a client device requests to play a recorded broadcast, the streaming server 112 gets the recorded video file from the databases 130 and delivers it to the interactive platform module 123 on demand. To playback other media content (slides, questions asked by participants during the live show, etc.), the cue organizer module 132 reads the recorded interactive commands and dispatches them as if it were a live broadcast administrator to the interactive application client module 119a.

FIG. 7 illustrates a GUI 200 presented to an administrator of the system 104 on his/her administrator client device $102_A$. Using the GUI 200, the system administrator is able to control and adapt to the broadcast needs the content present on the GUI of the client device as in 102 of each audience member, as discussed above with reference to FIG.

5a and FIG. 5b. The GUI 200 illustratively comprises a live event frame 202, in which the live event being broadcast is shown. The GUI 200 may further comprise a plurality of control elements, such as at least one drop down menu 204 and a plurality of selectable buttons 206, which enable the system administrator to control the content being broadcast as well as control the interaction of the audience members.

For instance, the system administrator may, using at least one of the interface devices, e.g. a mouse, provided on his or her administrator client device $102_A$, select a file from a list of files presented in the drop down menu 204 and stored in the memory 128 and/or the databases 130. The selected file may comprise on-demand content, such as a PowerPoint™ presentation, that the system administrator wishes to present to the users concurrently with the live broadcast. Once the file is selected form the menu 204, the system administrator may then press one of the buttons 206 to trigger retrieval and transmission of the file to the Interactive Applications Server 116 and inserts synchronization cue points in the broadcasted stream using the cue organizer module 132 of FIG. 3, as discussed above. The selected on-demand content may also be displayed in an on-demand content frame 208 of the GUI 200 simultaneously as it is being presented on the GUI of the client devices 102.

Each button 206 may further be associated with a given virtual interactive tool, e.g. a question bar, quiz, chat box, or the like, that may be presented on the client devices 102. As such, upon the system administrator pressing a corresponding one of the buttons 206, a control signal may be triggered and transmitted to the interactive applications server 116 to indicate that the interactive tool is to be launched by the web application of each client device 102, as discussed above. Selection of the control elements as in 204 and 206 illustratively results in a real time display of the selected content on the client devices 102, thus enabling dynamic and real time control of the broadcast.

FIG. 8 illustrates a GUI 300 presented to the client devices 102 when no webcam interaction is under way. The GUI 300 illustratively comprises a live event frame 302, in which the live broadcast content is presented, and at least one on-demand content frame 304, in which the on-demand content selected by the system administrator may be presented to be viewed by users concurrently with the live broadcast. In order to allow for various content to be presented within the GUI 300, the live event frame 302 is illustratively reduced in size relative to the entire display viewable on the client device 102. As discussed above, the on-demand content may comprise images, videos, animations, presentations, surveys, quizzes, toll-free call-numbers, and the like. A chat box may also be launched within the on-demand content frame 304. In addition, a web browser allowing users to navigate to a webpage presenting information related to the live broadcast may also be launched within the on-demand content frame 304. The GUI 300 may further comprise a bar 306 in which additional content, such as a "Yes/No" question bar or an evaluation "1 to 5" bar, may be displayed. It should be understood that any other suitable on-demand content may be presented in the frame 304.

Figure 9:
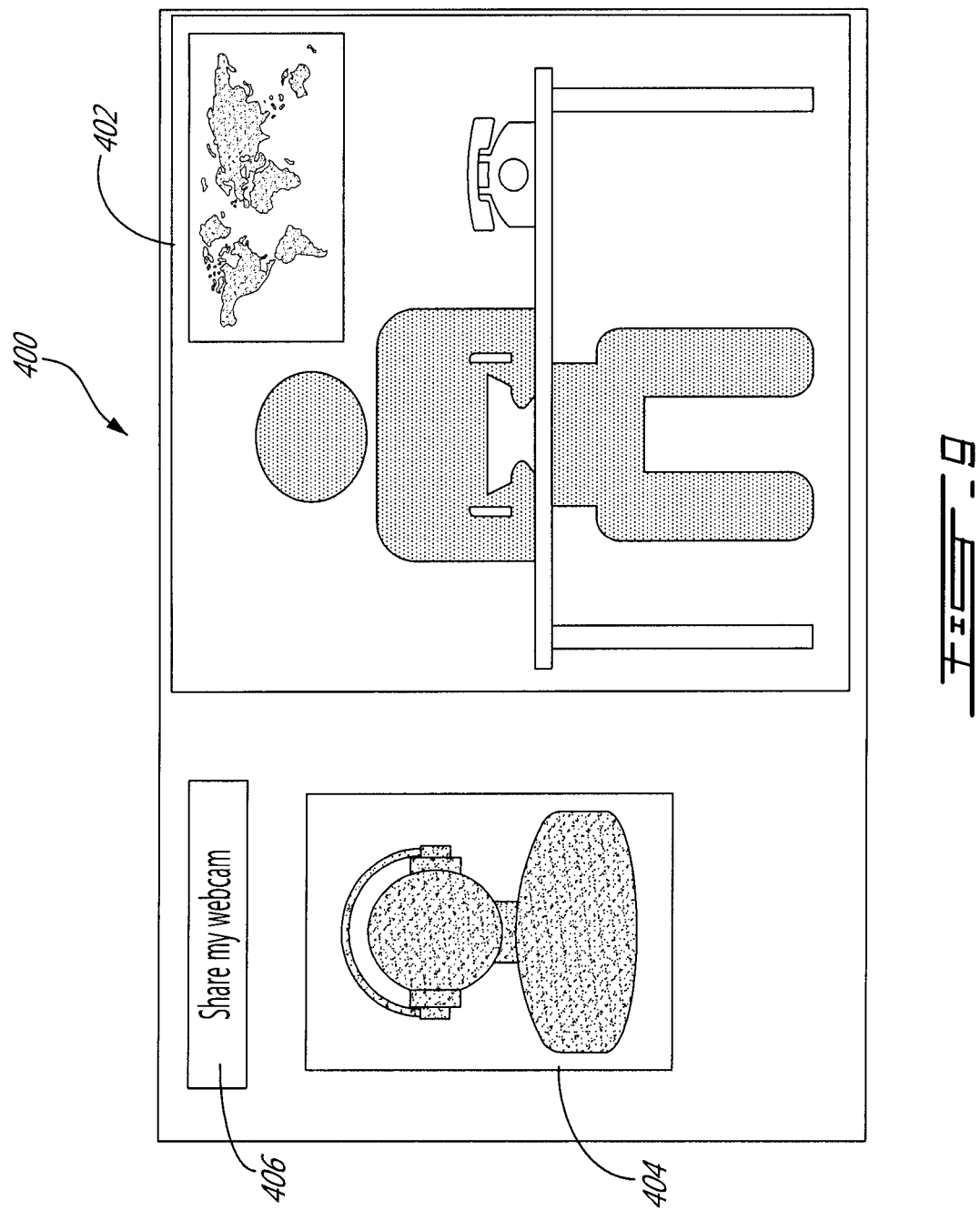
FIG. 9 is a schematic diagram of a graphical user interface of a webcam contributor in accordance with an illustrative embodiment.

FIG. 9 illustrates the GUI 400 presented on the client device $102_3$ of a webcam contributor, as discussed above with reference to FIG. 6. The GUI 400 comprises a live event frame 402, in which the live broadcast is presented. The GUI 400 further comprises a webcam frame 404, in which the webcam feed of the client device $102_3$ is presented once the user of the client device $102_3$ selects a corresponding option 406 presented on the GUI 208. The frames 402 and 404 illustratively show the interaction between the user of the client device $102_3$ and the presenter of the live broadcast in synchronism, i.e. without any time lag, as discussed above.

FIG. 10 illustrates the GUI 500 presented on the client devices $102_1$ and $102_2$ of members of the audience who did not share their webcam, unlike the user of the client device $102_3$. The GUI 500 comprises a live event frame 502, in which the live broadcast is presented. The GUI 500 further comprises a webcam frame 504, in which the webcam feed from the client device $102_3$ is presented. The webcam frame 504 is illustratively shown as being embedded within the live broadcast frame 502. Other configurations may also apply. The frames 502 and 504 illustratively show the interaction between the user of the client device $102_3$ and the presenter of the live broadcast with a broadcast delay, as discussed above. Although not shown, additional frames, such as an on-demand content frame or a bar (not shown), may also be part of the GUIs 400 and 500.

The frames 202, 208, 302, 304, 402, 404, 502, and 504, and the bar 306 are illustratively independent from one another. As such, it is possible to simultaneously present and interact with different content in multiple frames. It should be understood that the position, shape, and size of the frames 202, 208, 302, 304, 402, 404, 502, and 504, and of the bar 306 may be modified as desired by each user. For example, a user may reduce the size of a given frame 202, 208, 302, 304, 402, 404, 502, or 504, using the interface devices of his/her client device 102. Alternatively, an administrator of the system 104 may control the layout of the GUIs 200, 300, and 400 with the frames thereof being presented so as to automatically fit the size and shape of the screen of the client devices 102. The number of the frames 202, 208, 302, 304, 402, 404, 502, and 504, and of the bar 306 may also vary depending on the data to be presented to the users. As such, more than one on-demand content frame as in 304 may be presented within the same GUI 300. For example, a first on-demand content frame as in 304 may be used for presenting an animation while a second on-demand content frame as in 304 may be used for launching an Internet browsing window.

Figure 11A:
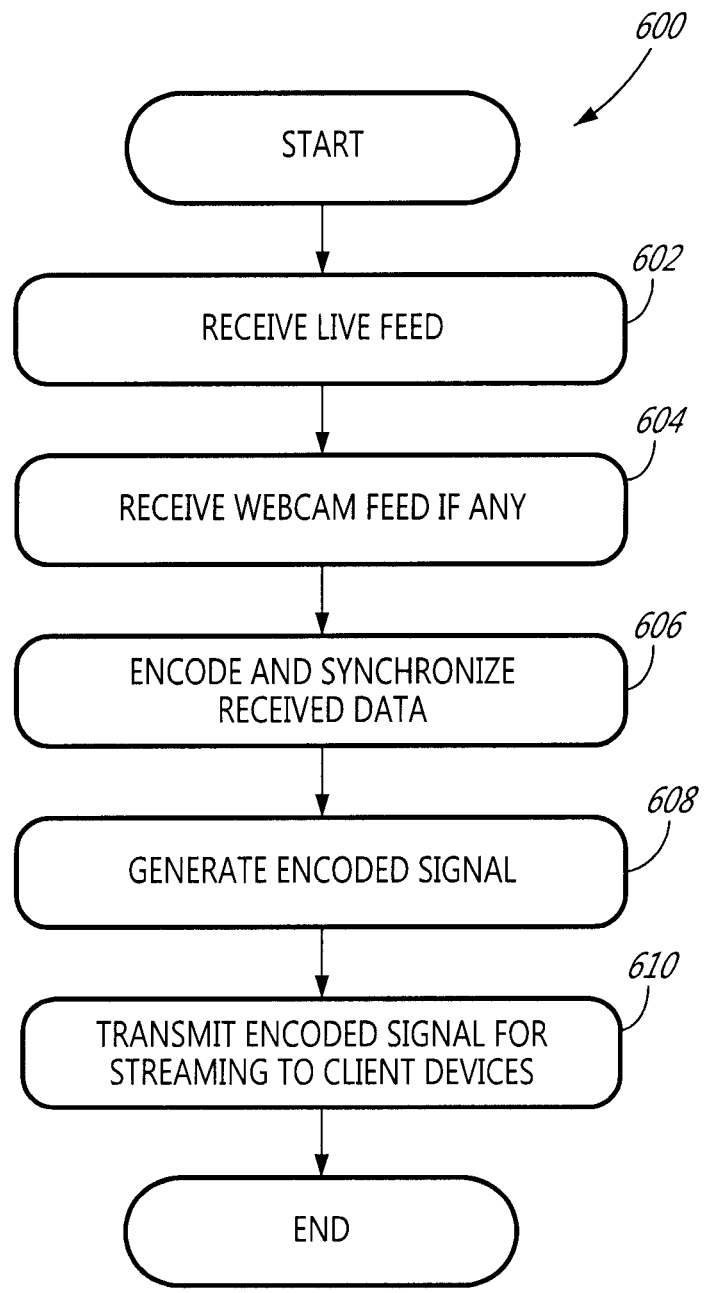

Referring to FIG. 11a, a method 600 for streaming a contributor's webcam feed to a large audience, as seen from the point of view of the encoder system 110, will now be described. The method 600 comprises at step 602 receiving a live feed from a broadcast studio or other suitable location. Once the live feed is received, a contributor's webcam feed may also be received at step 604. The received data may then be encoded, and synchronized by the encoder system 110 of FIG. 2a at step 606. An encoded signal may then be generated at step 608 and transmitted for streaming to the client devices as in 102 at step 610.

Figure 11B:
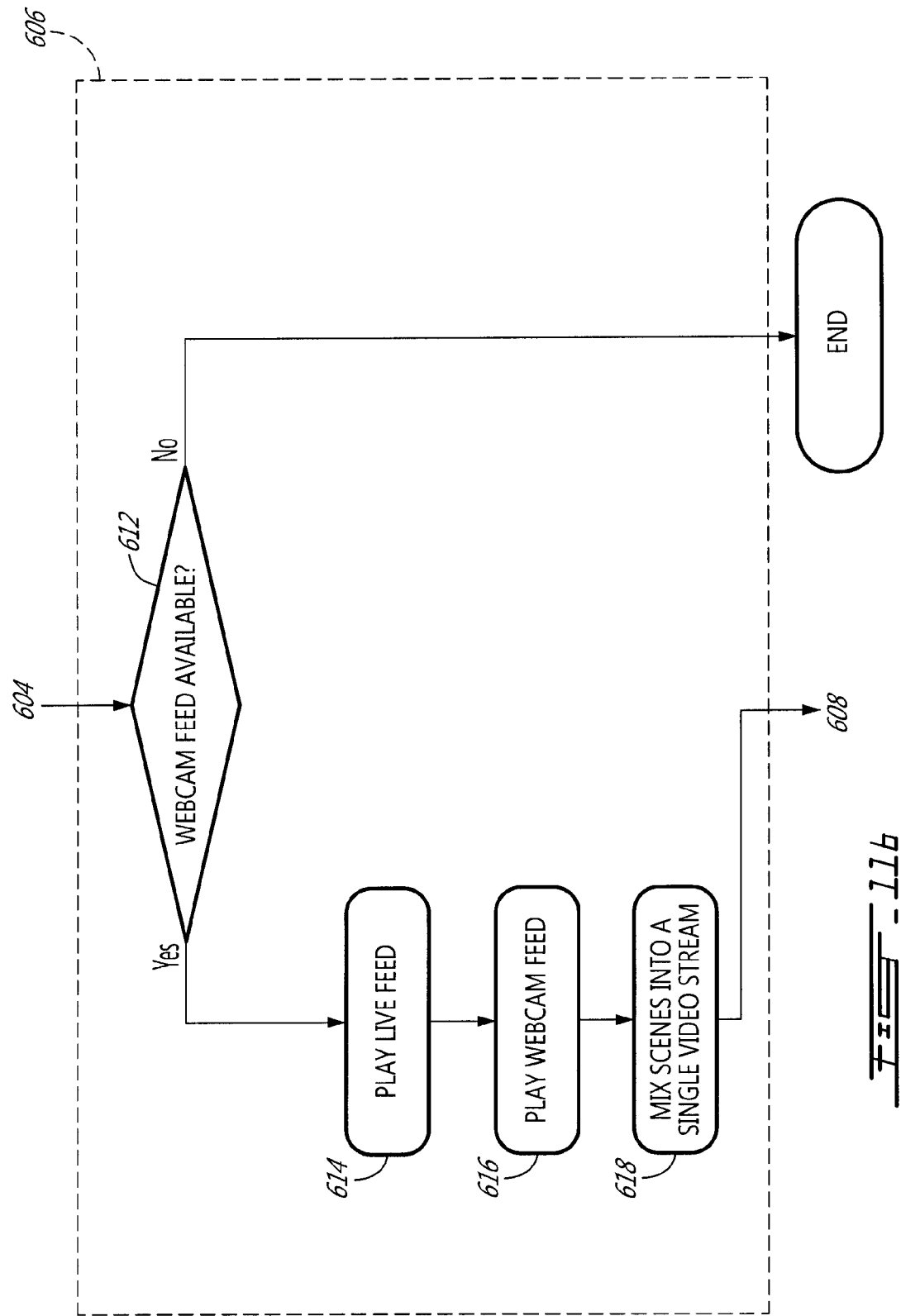
FIG. 11b is a flowchart of the step of FIG. 11a of encoding and synchronizing received data.

Referring to FIG. 11b, the step 606 of encoding and synchronizing the received data illustratively comprises assessing at step 612 whether webcam feed content is available. As discussed above, a request for streaming a contributor's webcam feed may be received from the interactive applications server 116 of FIG. 2a and the assessment performed at step 612 may be made on the basis of the received request. Upon determining whether the webcam feed is available, the next steps 614 and 616 are respectively to play the live feed directly from the switch 108 and to play the available webcam feed. Once the streams are played, they may be mixed at step 618 into a single video stream with a composed scene, in the manner discussed above.

Figure 11C:
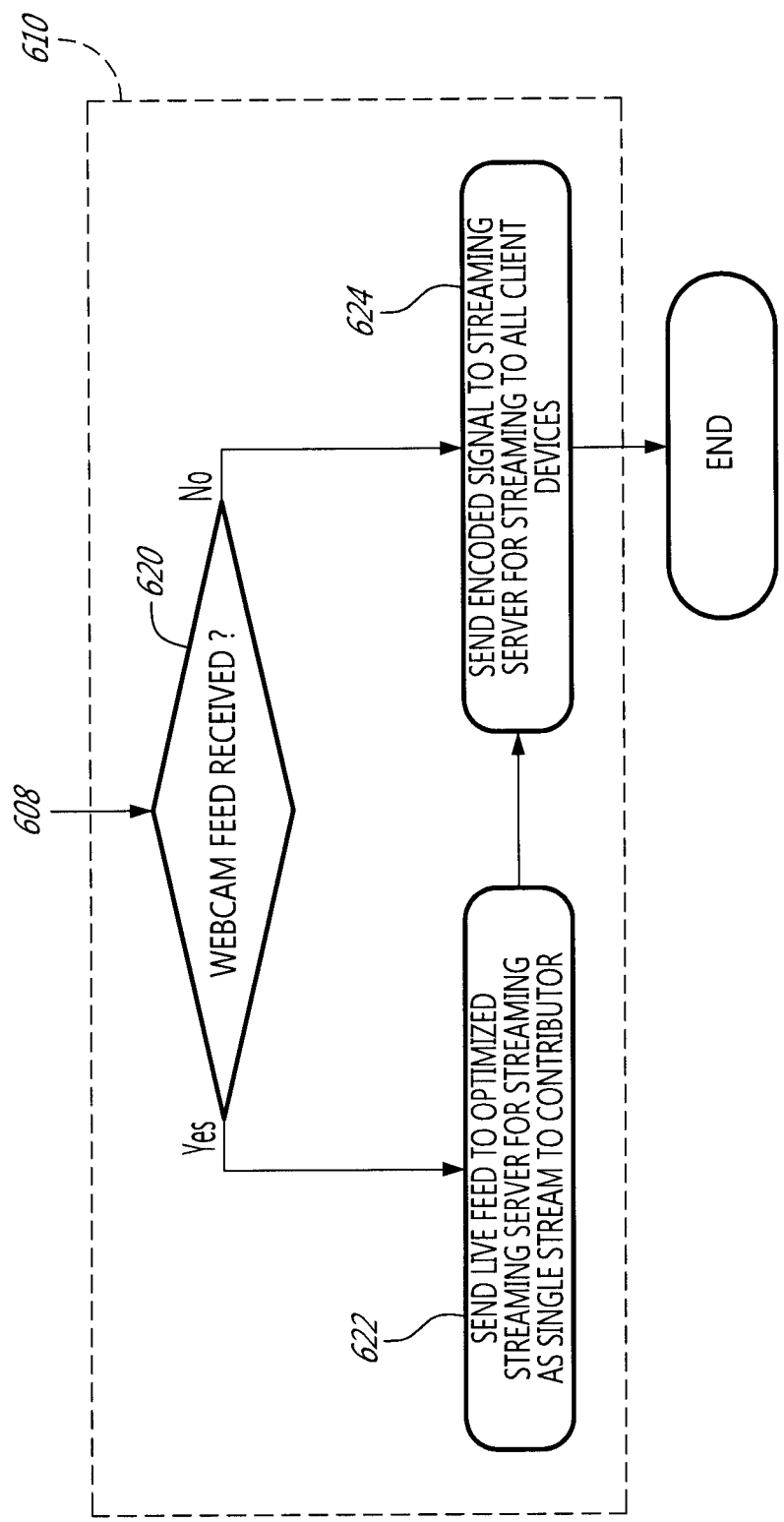
FIG. 11c is a flowchart of the step of FIG. 11a of transmitting the encoded signal for streaming.

Referring to FIG. 11c, the step 610 of transmitting the encoded signal for streaming to the client devices as in 102 comprises assessing at step 620 whether a webcam feed has been received. If this is the case, the live feed is illustratively sent at step 622 to the optimized streaming server 114 for streaming to the webcam contributor as a single stream, as discussed above. The encoded signal comprising both the live feed and the webcam feed may then be sent at step 624 to the streaming server 112. The encoded signal may then be streamed as a multiplexed stream to all client devices 102 other than the webcam contributor. If no webcam feed has been received, the encoded signal is illustratively sent directly to the streaming server 112 at step 624 for streaming to all client devices 102.

Referring to FIG. 12a, the method 700 of streaming a contributor's webcam feed to a large audience, as seen from the point of view of a webcam contributor, will be now described. The method 700 comprises at step 702 receiving a live feed from the optimized streaming server 114. The next step 706 is illustratively to receive interactive commands, if any, from the interactive applications server 116. Once a webcam conference command is received, the appropriate streams necessary to display a synchronized conversation are played on the client device 102 at step 706.

Referring to FIG. 12b, the step 706 of playing the streams comprises assessing at step 708 whether the client is a webcam contributor. If this is the case, the contributor publishes at step 710 his/her own webcam stream on the optimized stream server 114. Then streams of other contributors, if any, and the live program stream are played without delay from the optimized streaming server 114 at steps 712 and 714 respectively. If the client is not a webcam contributor, the live program feed is played at step 716 from the streaming server 112 with a delay of five (5) seconds.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. It should be noted that the present invention can be carried out as a method, can be embodied in a system, and/or on a computer readable medium. The embodiments of the invention described above are intended to be exemplary only. The scope of the invention is therefore intended to be limited solely by the scope of the appended claims.

The invention claimed is:

1. A system for streaming content to a plurality of devices over a network, the system comprising:
a memory;
a processor; and
an encoding application, a streaming application, and an optimized streaming application stored in the memory,
the encoding application executable by the processor for receiving from a first source a first stream comprising a first live feed and sending the first stream to the streaming application,
the streaming application executable by the processor for receiving from the encoding application the first stream, and sending the first stream in multicast to the plurality of devices at a first latency, wherein one of the plurality of devices disconnects from the streaming application and connects to the optimized streaming application to become a contributing device;
the optimized streaming application executable by the processor for receiving, from the contributing device, a second stream comprising a second live feed, for receiving from the encoding application the first stream, and for sending to the contributing device the first stream and the second stream concurrently at a secondly latency lower than the first latency;
the encoding application executable by the processor for receiving from the optimized streaming application the second live feed, synchronizing the first live feed with the second live feed, generating a third stream comprising the sychronized first live feed and second live feed, and sending the third stream to the streaming application; and
the streaming application executable by the processor for receiving the third stream from the encoding application and sending the third stream in multicast to the plurality of devices other than the contributing device at the first latency.

2. The system of claim 1, wherein the second live feed comprises at least one of a webcam feed, a desktop sharing feed, and a whiteboard feed.

3. The system of claim 1, wherein sending the third stream in multicast to the plurality of devices other than the contributing device comprises copying the third stream into a plurality of copied streams and transmitting, after a predetermined time delay, each one of the plurality of copied streams to each one of the plurality of devices other than the contributing device for rendering thereon of the synchronized first live feed and second live feed.

4. The system of claim 1, wherein the memory has stored therein on-demand content and an interactive application executable by the processor for receiving a command signal indicative of a command to integrate the on-demand content to the first live feed and sending the command signal to the streaming application, further wherein the streaming application is executable for receiving the command signal, embedding into the first live feed at least one synchronization pulse indicative of a timing at which the on-demand content is to be integrated to the first live feed, and outputting to the optimized streaming application a first control signal comprising the at least one embedded synchronization pulse.

5. The system of claim 4, wherein the interactive application is further executable for outputting to each one of the plurality of devices a second control signal comprising instructions for causing the on-demand content to be retrieved from the memory, the first control signal to be obtained from the optimized streaming application, the at least one synchronization pulse to be extracted from the first control signal, and the retrieved on-demand content to be integrated to the first live feed in accordance with the timing from the at least one synchronization pulse.

6. The system of claim 4, wherein the memory has stored therein the on-demand content comprising at least one of text, images, videos, animations, presentations, surveys, and voting results.

7. The system of claim 4, wherein the interactive application is executable by the processor for receiving at least one interactive command indicative of a request to integrate at least one of a plurality of interactive tools to the first live feed and for outputting to each one of the plurality of devices a third control signal comprising instructions for causing the at least one of the plurality of interactive tools to be launched on each one of the plurality of devices concurrently with rendering of the third stream on each one of the plurality of devices.

8. The system of claim 7, wherein the interactive application is executable for causing the launch of the at least selected one of the plurality of interactive tools comprising at least one of a question bar, a chatbox, a voting bar, an evaluation bar, and a web browser.

9. A computer-implemented method for streaming content to a plurality of devices over a network, the method comprising executing on a processor program code for:
   receiving from a first source a first stream comprising a first live feed;
   sending the first stream in multicast to the plurality of devices at a first latency;
   receiving a request from one of the plurality of devices to contribute content;
   instructing the one of the plurality of devices to disconnect from a streaming server and connect to an optimized streaming server, the one of the plurality of devices becoming a contributing device;
   receiving from the contributing device a second stream comprising a second live feed;
   sending to the contributing device the first stream and the second stream concurrently at a second latency lower than the first latency;
   synchronizing the first live feed with the second live feed;
   generating a third stream comprising the synchronized first live feed and second live feed; and
   sending the third stream to each one of the plurality of devices other than the contributing device at the first latency.

10. The method of claim 9, wherein sending the third stream comprises sending after a predetermined time delay the third stream to each one of the plurality of devices other than the contributing device for rendering thereon of the synchronized first live feed and second live feed.

11. The method of claim 9, further comprising receiving a command signal indicative of a command to integrate to the first live feed on-demand content stored in memory, embedding into the first live feed at least one synchronization pulse indicative of a timing at which the on-demand content is to be integrated to the first live feed, and outputting to each one of the plurality of devices a first control signal comprising instructions for causing the on-demand content to be retrieved from the memory and the retrieved on-demand content to be integrated to the first live feed in accordance with the timing from the at least one synchronization pulse.

12. The method of claim 9, further comprising receiving at least one interactive command indicative of a request to integrate at least one of a plurality of interactive tools to the first live feed and outputting to each one of the plurality of devices a second control signal comprising instructions for causing the at least one of the plurality of interactive tools to be launched on each one of the plurality of devices concurrently with rendering of the third stream on each one of the plurality of devices.

13. A non-transitory computer readable medium having stored thereon program code executable by a processor for streaming content to a plurality of devices over a network, the program code executable for:
   receiving from a first source a first stream comprising a first live feed;
   sending the first stream in multicast to the plurality of devices at a first latency;
   receiving a request from one of the plurality of devices to contribute content;
   instructing the one of the plurality of devices to disconnect from a streaming server and connect to an optimized streaming server, the one of the plurality of devices becoming a contributing device;
   receiving from the contributing device a second stream comprising a second live feed;
   sending to the contributing device the first stream and the second stream concurrently at a second latency lower than the first latency
   synchronizing the first live feed with the second live feed;
   generating a third stream comprising the synchronized first live feed and second live feed; and
   sending the third stream to each one of the plurality of devices other than the contributing device at the first latency.

* * * * *